US012054587B2

(12) United States Patent
Iwata et al.

(10) Patent No.: US 12,054,587 B2
(45) Date of Patent: Aug. 6, 2024

(54) SPHERICAL POLYMETHYLSILSESQUIOXANE PARTICLES

(71) Applicant: TOKUYAMA CORPORATION, Shunan (JP)

(72) Inventors: Toru Iwata, Shunan (JP); Yohei Chikashige, Shunan (JP); Tadaharu Komatsubara, Shunan (JP)

(73) Assignee: TOKUYAMA CORPORATION (JP)

(*) Notice: Subject to any disclaimer, the term of this patent is extended or adjusted under 35 U.S.C. 154(b) by 581 days.

(21) Appl. No.: 17/051,696

(22) PCT Filed: Jul. 1, 2019

(86) PCT No.: PCT/JP2019/026135
§ 371 (c)(1),
(2) Date: Oct. 29, 2020

(87) PCT Pub. No.: WO2020/009068
PCT Pub. Date: Jan. 9, 2020

(65) Prior Publication Data

US 2021/0238359 A1 Aug. 5, 2021

(30) Foreign Application Priority Data

Jul. 3, 2018 (JP) ................................ 2018-126534
Jul. 6, 2018 (JP) ................................ 2018-128713

(51) Int. Cl.
*C08G 77/04* (2006.01)
*C08G 77/08* (2006.01)

(52) U.S. Cl.
CPC .......... *C08G 77/045* (2013.01); *C08G 77/04* (2013.01); *C08G 77/08* (2013.01)

(58) Field of Classification Search
CPC ......... C08G 77/04; C08G 77/14; C08G 77/16
See application file for complete search history.

(56) References Cited

U.S. PATENT DOCUMENTS 4,528,390 A 7/1985 Kimura
4,977,200 A 12/1990 Itoh et al.
(Continued)

FOREIGN PATENT DOCUMENTS

CN 104119545 A 10/2014
GB 2216535 A 10/1989
(Continued)

OTHER PUBLICATIONS

Aston-Chemicals, MST-547-FS (Year: 2015).*
(Continued)

*Primary Examiner* — Hoa (Holly) Le
(74) *Attorney, Agent, or Firm* — Harness, Dickey & Pierce, P.L.C.

(57) ABSTRACT

Provided is a novel spherical polymethylsilsesquioxane particle having an unprecedentedly large specific surface area ratio. The spherical polymethylsilsesquioxane particle includes a particle main body containing at least: a network structure formed by silicon atoms (n) and oxygen atoms (n) bonded to the silicon atoms (n); a methyl group bonded to at least one of the silicon atoms (n); and an alkoxyl group bonded to at least one of the silicon atoms (n), wherein the spherical polymethylsilsesquioxane particle satisfies the following expression (1): Expression (1) $S_1/S_2 \geq 8.0$, in the expression (1), $S_1$ represents a specific surface area ($m^2/g$) measured by a nitrogen adsorption BET one-point method, $S_2$ represents $6/(\rho \times D50)$ and a unit thereof is ($m^2/g$), $\rho$ represents a particle density ($g/m^3$), and D50 represents a volume-based 50% cumulative diameter (m) measured by a laser diffraction/scattering method.

15 Claims, 6 Drawing Sheets

(56) References Cited

U.S. PATENT DOCUMENTS

| | | | | |
|---|---|---|---|---|
| 5,128,204 | A | 7/1992 | Charmot | |
| 5,149,748 | A * | 9/1992 | Shimizu | C08J 3/12 428/407 |
| 5,415,912 | A * | 5/1995 | Ushizaka | C09J 11/08 428/447 |
| 9,809,682 | B2 * | 11/2017 | Ishizu | G03G 9/09725 |
| 2002/0010300 | A1 * | 1/2002 | Mimoun | C08J 3/12 528/10 |
| 2002/0107316 | A1 | 8/2002 | Bice et al. | |
| 2006/0154809 | A1 * | 7/2006 | Rauscher | C08F 10/00 502/103 |
| 2010/0256321 | A1 * | 10/2010 | Kim | C08G 77/04 528/21 |
| 2013/0040144 | A1 | 2/2013 | Inokuchi et al. | |
| 2014/0295341 | A1 | 10/2014 | Fomitchev et al. | |
| 2014/0322280 | A1 | 10/2014 | Inokuchi | |
| 2016/0045405 | A1 | 2/2016 | Inokuchi | |
| 2016/0319077 | A1 * | 11/2016 | Ishizu | G03G 9/09708 |

FOREIGN PATENT DOCUMENTS

| | | | |
|---|---|---|---|
| GB | 2 230 018 | A * | 10/1990 |
| GB | 2230018 | A | 10/1990 |
| JP | S60-13813 | A | 1/1985 |
| JP | H01-217039 | A | 8/1989 |
| JP | H01-242625 | A | 9/1989 |
| JP | H01-249847 | A | 10/1989 |
| JP | H06-179751 | A | 6/1994 |
| JP | H06-263875 | A | 9/1994 |
| JP | 3970449 | B2 | 9/2007 |
| JP | 2008-208158 | A | 9/2008 |
| WO | 2013-161098 | A1 | 10/2013 |
| WO | 2014-054496 | A1 | 4/2014 |
| WO | 2015/107961 | A1 | 7/2015 |

OTHER PUBLICATIONS

Kobo Products, Inc. MST-547-FS (Year: 2015).*

Commercial polymethylsilsesquioxane Datasheet from New Vision (Year: 2018).*

Sun, Hua-wei et al., Latest progress on researches of the cage polyhedral oligomeric slisesquioxane; Fine and specialty chemicals, Feb. 2011 (6 pages, English abstract, category A reference in CN office action).

Li Yunxing, The study on preparation, characterization and application of functional polysilsesquioxane microspheres, China's Excellent Master's Enterprise Essays in Beijing Engineering Sciend and Technology, Issue 2, Feb. 15, 2018, (81 pages, English abstract, category A reference in CN office action).

Dire, Sandra et al. Abstract of: Preparation of Dense and Porous Silicon Oxycarbide Submicrometer-Sized Spheres Using a Modified Stober Process; Journal of the American Ceramic Society / vol. 94, Issue 11 / (2 pages, in English, category A reference in CN office action).

Taiwan Office Action including English abstract of Taiwan Office Action dated Jun. 24, 2022 in corresponding Taiwan Application No. TW 108123231 (5 pages).

International Search Report (in English and Japanese) issued in PCT/JP2019/026135, mailed Jul. 23, 2019; ISA/JP.

* cited by examiner

SPHERICAL POLYMETHYLSILSESQUIOXANE PARTICLES

CROSS REFERENCE TO RELATED APPLICATIONS

This application is a U.S. National Phase Application under 35 U.S.C. 371 of International Application No. PCT/JP2019/026135, filed on Jul. 1, 2019, which is based on and claims the benefit of priority from Japanese Patent Application No. 2018-126534, filed on Jul. 3, 2018 and Japanese Patent Application No. 2018-128713, filed on Jul. 6, 2018. The entire disclosures of all of the above applications are incorporated herein by reference.

BACKGROUND

Technical Field

The present invention relates to a spherical polymethylsilsesquioxane particle.

Related Art

Polymethylsilsesquioxane powder having hydrophobic alkyl groups on the particle surface and inside thereof is generally excellent in environmental stability, dispersibility, heat resistance, solvent resistance, water repellency, and the like. Accordingly, the polymethylsilsesquioxane powder is used in various applications, such as a modifier or coating material for a polymer material, an external additive for toner, a spacer for a sealing material for a liquid crystal, and an additive for a paint or a cosmetic.

As the polymethylsilsesquioxane powder and a production method therefor, there have been proposed various powders and methods. For example, in JP 60-13813 A, there is a report that, as an additive for a paint, polymethylsilsesquioxane powder is obtained by hydrolyzing and condensing a methyltrialkoxysilane, and washing the resultant product with water, followed by drying. In addition, in JP 01-217039 A, there is a report that a polyorganosilsesquioxane fine particle is obtained by subjecting a hydrolyzed and partially condensed product of an organotrialkoxysilane to a polycondensation reaction in an alkaline aqueous solution.

In JP 2008-208158 A, there is a report that, for use in an antireflection film for a liquid crystal display, a spherical polyorganosilsesquioxane fine particle is obtained by hydrolyzing and partially condensing an organotrialkoxysilane, leaving the resultant at rest to cause layer separation, and mixing an alcohol mixture of a partial condensate in the resultant lower layer with an alkaline aqueous solution. In addition, in WO 2015/107961 A1, there is a disclosure of a hydrophobized spherical polyorganosilsesquioxane fine particle having a median diameter within a range of from 0.05 μm to 0.3 μm, which is useful as, for example, an external additive for toner.

Marketing of various silica-based powders, such as the polymethylsilsesquioxane powder described above, on markets includes: (i) need-meeting marketing involving designing various characteristics of powders in accordance with use applications; and (ii) need-developing marketing involving developing powders having novel characteristics that are unprecedented, and then, with a focus on the novel characteristics of the powders, for example, developing new applications, or replacing conventional products (commercially available powders) that have already been in use in given applications. In addition, the silica-based powders presently find themselves in the following situation: one or more new markets are created or acquired through the need-developing marketing in many cases. Therefore, it is extremely important to develop, without being bound by existing needs, polymethylsilsesquioxane powder having novel characteristics that are unprecedented.

Meanwhile, the inventors of the present invention have investigated the related-art polymethylsilsesquioxane powder exemplified in JP 60-13813 A, JP 01-217039 A, JP 2008-208158 A, and WO 2015/107961 A1 and the like, and as a result, have recognized that, although the powder disclosed in WO 2015/107961 A1 has a relatively large value for the ratio of its actual specific surface area to its specific surface area calculated on the basis of its particle diameter and the like (theoretical specific surface area) (hereinafter sometimes referred to as "specific surface area ratio"), there exists no powder surpassing that value.

The present invention has been made in view of the above-mentioned circumstances, and an object of the present invention is to provide a novel spherical polymethylsilsesquioxane particle having unprecedentedly large specific surface area ratio.

SUMMARY

The above-mentioned object is achieved by the present invention described below. That is, according to one embodiment of the present invention, there is provided a spherical polymethylsilsesquioxane particle, including a particle main body containing at least: a network structure formed by silicon atoms (n) and oxygen atoms (n) bonded to the silicon atoms (n); a methyl group bonded to at least one of the silicon atoms (n); and an alkoxyl group bonded to at least one of the silicon atoms (n), wherein the spherical polymethylsilsesquioxane particle satisfies the following expression (1):

$$S_1/S_2 \geq 8.0 \quad \text{Expression (1)}$$

in the expression (1), $S_1$ represents a specific surface area ($m^2/g$) measured by a nitrogen adsorption BET one-point method, $S_2$ represents $6/(\rho \times D50)$ and a unit thereof is ($m^2/g$), $\rho$ represents a particle density ($g/m^3$), and D50 represents a volume-based 50% cumulative diameter (m) measured by a laser diffraction/scattering method.

In the spherical polymethylsilsesquioxane particle according to one embodiment of the present invention, the ratio $S_1/S_2$ shown in the expression (1) is preferably 10.0 or more.

In the spherical polymethylsilsesquioxane particle according to another embodiment of the present invention, the particle main body preferably has a surface free from being subjected to any surface treatment.

In the spherical polymethylsilsesquioxane particle according to another embodiment of the present invention, the spherical polymethylsilsesquioxane particle preferably has a degree of hydrophobicity measured by a methanol titration method of from 25 vol % to 45 vol %.

In the spherical polymethylsilsesquioxane particle according to another embodiment of the present invention, the particle main body preferably has a surface subjected to surface treatment with a hydrophobizing agent.

In the spherical polymethylsilsesquioxane particle according to another embodiment of the present invention, the particle main body preferably contains, at least in a vicinity of a surface thereof, a trialkylsilyloxy group bonded to at least one of the silicon atoms (n).

In the spherical polymethylsilsesquioxane particle according to another embodiment of the present invention, the trialkylsilyloxy group is preferably a trimethylsilyloxy group.

In the spherical polymethylsilsesquioxane particle according to another embodiment of the present invention, the spherical polymethylsilsesquioxane particle preferably has a degree of hydrophobicity measured by a methanol titration method of more than 45 vol % and 70 vol % or less.

In the spherical polymethylsilsesquioxane particle according to another embodiment of the present invention, the spherical polymethylsilsesquioxane particle preferably satisfies the following expression (2):

$$0.016 \leq A/B \leq 0.030 \quad \text{Expression (2)}$$

in the expression (2), A and B each represent an area of a peak measured by $^{13}C$ DDMAS NMR, A represents an area of a peak derived from a carbon atom contained in the alkoxyl group, the carbon atom being bonded to an oxygen atom (tg) contained in the alkoxyl group, and B represents an area of a peak derived from a carbon atom contained in the methyl group bonded to at least one of the silicon atoms (n).

In the spherical polymethylsilsesquioxane particle according to another embodiment of the present invention, the ratio A/B shown in the expression (2) is preferably from 0.020 to 0.030.

In the spherical polymethylsilsesquioxane particle according to another embodiment of the present invention, the 50% cumulative diameter is preferably from 0.14 μm to 2.0 μm.

In the spherical polymethylsilsesquioxane particle according to another embodiment of the present invention, the 50% cumulative diameter is preferably more than 0.30 μm and 2.0 μm or less.

In the spherical polymethylsilsesquioxane particle according to another embodiment of the present invention, the 50% cumulative diameter is preferably more than 0.30 μm.

In the spherical polymethylsilsesquioxane particle according to another embodiment of the present invention, the alkoxyl group is preferably a methoxy group.

Advantageous Effects of Invention

According to the present invention, the novel spherical polymethylsilsesquioxane particle having an unprecedentedly large specific surface area ratio can be provided.

DETAILED DESCRIPTION

Figure 1:
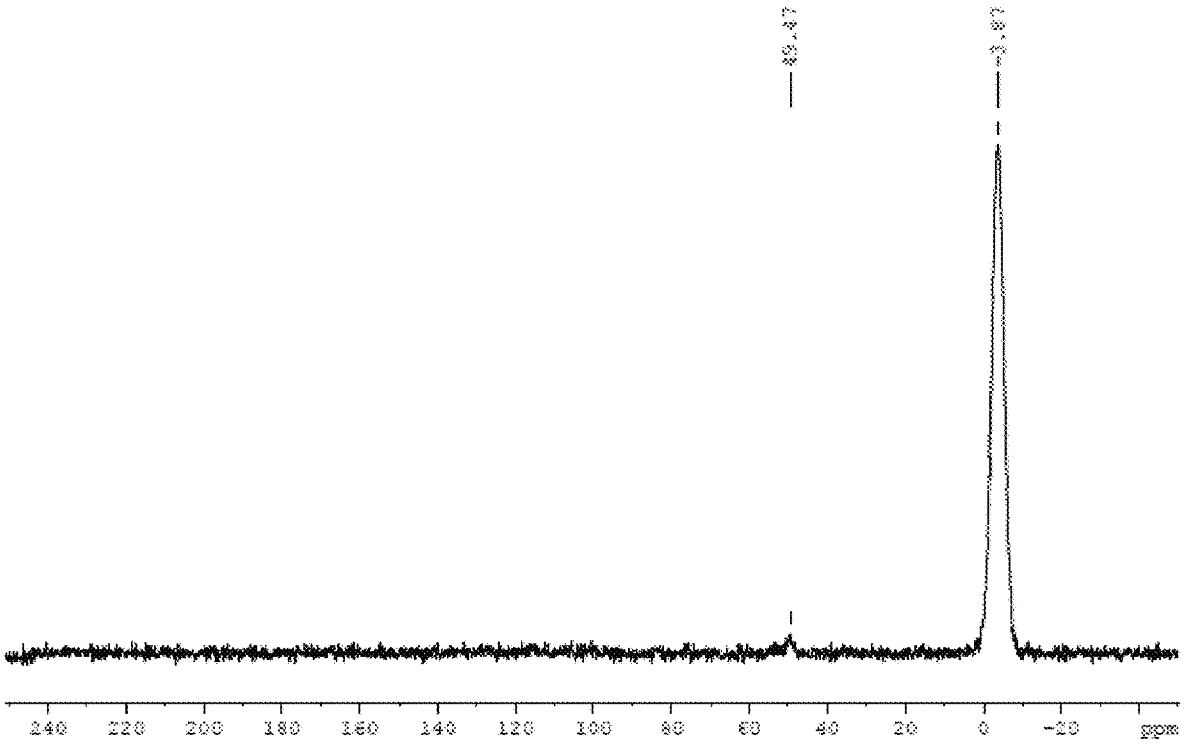
FIG. 1 is an NMR spectrum obtained by $^{13}C$ DDMAS NMR measurement of spherical polymethylsilsesquioxane particles (non-surface-treated particles) of Example A2.

A spherical polymethylsilsesquioxane particle (hereinafter sometimes abbreviated simply as "particle") according to one embodiment of the present invention includes a particle main body containing at least: a network structure formed by silicon atoms (n) and oxygen atoms (n) bonded to the silicon atoms (n); a methyl group bonded to at least one of the silicon atoms (n); and an alkoxyl group bonded to at least one of the silicon atoms (n), wherein the spherical polymethylsilsesquioxane particle satisfies the following expression (1).

$$S_1/S_2 \geq 8.0 \quad \text{Expression (1)}$$

In the expression (1), $S_1$ represents a specific surface area ($m^2/g$) measured by a nitrogen adsorption BET one-point method, $S_2$ represents $6/(\rho \times D50)$, a unit thereof being ($m^2/g$), ρ represents a particle density ($g/m^3$), and D50 represents a volume-based 50% cumulative diameter (m) measured by a laser diffraction/scattering method.

In the expression (1), $S_1$ means the actual specific surface area of the particle according to this embodiment (BET specific surface area), and $S_2$ means a specific surface area calculated from the particle diameter of the particle according to this embodiment and the like (theoretical specific surface area), and hence $S_1/S_2$ means a ratio between those two specific surface areas. Accordingly, a value of the specific surface area ratio $S_1/S_2$ closer to 1 means that the surface of the particle is smoother, and a larger value of the specific surface area ratio $S_1/S_2$ means that the surface of the particle is less smooth; in other words, the surface of the particle is rougher (e.g., the surface of the particle has a larger number of fine irregularities formed thereon), and/or that a larger number of fine pores that allow the entrance of nitrogen are present at least in the vicinity of the surface of the particle. In addition, the spherical polymethylsilsesquioxane particle according to this embodiment has a specific surface area ratio $S_1/S_2$ of 8.0 or more, and such value of the specific surface area ratio $S_1/S_2$ has not been possible to achieve in a related-art spherical polymethylsilsesquioxane particle.

The specific surface area ratio $S_1/S_2$ may be appropriately selected within the range of 8.0 or more depending on, for example, applications of the particle according to this embodiment, but is generally preferably 10.0 or more, more preferably 12.0 or more, still more preferably 15.0 or more. In addition, the upper limit value of the specific surface area ratio $S_1/S_2$ is not particularly limited, but is generally preferably 100 or less, more preferably 50 or less. In addition, the specific surface area $S_1$ is not particularly limited, but is preferably from 30 $m^2/g$ to 500 $m^2/g$, more preferably from 50 $m^2/g$ to 350 $m^2/g$.

The particle according to this embodiment, which has a specific surface area ratio $S_1/S_2$ of 8.0 or more, can be expected to exhibit, for example, such various actions and effects as listed below.

(a) As compared to the related-art particle, the particle according to this embodiment has a larger contact area when the particle according to this embodiment is allowed to adhere to the surface of another solid member. Accordingly, the adhesiveness of the particle according to this embodiment to the surface of the other solid member can be increased.

(b) When the particle according to this embodiment is dispersed in another curable liquid material, followed by curing of the curable liquid material, the particle according to this embodiment is fixed in a matrix obtained by the curing of the curable liquid material. Meanwhile, as compared to the related-art particle, the particle according to this embodiment has a rougher surface. Accordingly, the particle according to this embodiment is firmly fixed to the matrix by a larger anchoring effect.

(c) When it is assumed that the particle diameter of the related-art particle and the particle diameter of the particle according to this embodiment are equal to each other, the particle according to this embodiment has a larger actual surface area as compared to the related-art particle. Accordingly, the particle according to this embodiment can adsorb or hold a larger amount of a substance having high affinity for the surface of the particle.

(d) As compared to the related-art particle, the particle according to this embodiment has a rougher surface. Accordingly, the particle according to this embodiment can more effectively scatter light entering from outside.

Therefore, when attention is at least focused on such various actions and effects mainly resulting from the large specific surface area ratio $S_1/S_2$ as exemplified in (a) to (d) above, or merely on various actions and effects mainly resulting from the large specific surface area ratio $S_1/S_2$, the particle according to this embodiment can be expected to find utilization in such various industrial applications as exemplified below. Besides, in the case of an application in which a related-art particle is already utilized, the particle according to this embodiment can be expected to be utilized as a substitute for the related-art particle in the application.

(A) As an industrial utilization example with attention focused at least on the action and effect described in (a) above, there is given a spacer to be arranged between two solid members for the purpose of, for example, keeping their distance approximately constant. When the particle according to this embodiment is used as the spacer, it can be expected that the occurrence of a displacement of the particle according to this embodiment in a direction parallel to the surface of each of the solid members is easily suppressed. A typical specific example of such spacer application is a spacer for a liquid crystal, for keeping the thickness of a liquid crystal layer formed between two substrates approximately constant.

(B) As an industrial utilization example with attention focused at least on the action and effect described in (b) above, there is given a such solid member having particles dispersed and incorporated therein that it is not preferred that the particles be detached and fall off of the main body of the solid member during its use. Specific examples of such application include: an abrasive pad having the particle according to this embodiment dispersed and incorporated therein as an abrasive; and a dental composite resin having the particle according to this embodiment dispersed and incorporated therein as a filling material.

(C) As an industrial utilization example with attention focused at least on the action and effect described in (c) above, there is given utilization of the particle according to this embodiment as various adsorbents and carriers.

(D) As an industrial utilization example with attention focused at least on the action and effect described in (d) above, there is given a case in which optical characteristics resulting from a high light-scattering property (e.g., matting and opacity) are imparted to a member using the particle according to this embodiment. Specific examples of such application include: a rubber member, resin member, or paint containing the particle according to this embodiment as a filling material or an optical characteristic-adjusting material; and a cosmetic using the particle according to this embodiment.

(E) As an industrial utilization example with attention focused at least merely on the large specific surface area ratio $S_1/S_2$, there is given, for example, utilization of the particle according to this embodiment as an abrasive. The spherical polymethylsilsesquioxane particle according to this embodiment is greatly different from the related-art spherical polymethylsilsesquioxane particle in specific surface area ratio $S_1/S_2$. This means a great difference in the mode of contact sliding of the particle and a solid surface at the time of polishing. Accordingly, as compared to a related-art spherical polymethylsilsesquioxane particle of substantially the same particle diameter and material, the particle according to this embodiment can be expected to achieve new abrasive characteristics different from those of the related-art particle.

The actions and effects described in (a) to (d) above are just some examples, and do not limit the presence of unknown actions and effects other than those exemplified in (a) to (d) above as actions and effects resulting from the specific surface area ratio $S_1/S_2$ of 8.0 or more. In addition, the industrial utilization examples of the particle according to this embodiment described in (A) to (E) above are merely illustrative, and do not limit other industrial utilization potentials of the particle according to this embodiment. Utilization examples and applications of the particle according to this embodiment may be other than those exemplified in (A) to (E) above, and examples thereof may also include: a filler for a semiconductor encapsulation material, a film, or the like; and an additive for modifying a plastic, a rubber, paper, or the like.

In addition, when the particle according to this embodiment is utilized in various industrial applications, (i) in a certain application, the particle according to this embodiment may be utilized with attention focused mainly on the large specific surface area ratio $S_1/S_2$ or an action and effect resulting therefrom, (ii) in a certain application, the particle according to this embodiment may be utilized with attention focused on a complex combination of the large specific surface area ratio $S_1/S_2$ or an action and effect resulting therefrom, and another characteristic or an action and effect thereof, and (iii) in a certain application, the particle according to this embodiment may be utilized with attention focused mainly on another characteristic or action and effect. In the above-mentioned case (iii), (iiia) irrespective of the intention of one who utilizes the particle according to this embodiment, the large specific surface area ratio $S_1/S_2$ or an action and effect resulting therefrom may turn out to be conducive to improving some characteristic in a certain application, and (iiib) irrespective of the intention of one who utilizes the particle according to this embodiment, a complex combination of the large specific surface area ratio $S_1/S_2$ or an action and effect resulting therefrom, and another characteristic or an action and effect thereof may turn out to be conducive to improving some characteristic in a certain application.

The BET specific surface area $S_1$ shown in the expression (1) is measured by a nitrogen adsorption BET one-point method. The measurement was performed by the following procedure. First, around 0.12 of g spherical polymethylsilsesquioxane powder was measured into a measurement cell that had been weighed. Next, the measurement cell loaded with the spherical polymethylsilsesquioxane powder was placed in a mantle heater, and then, while the inside of the mantle heater was purged with nitrogen, pretreatment of heating at 200° C. for 80 minutes was performed. After that, the measurement cell, which had been cooled to room temperature, was placed in a BET specific surface area measurement apparatus (SA-1000 manufactured by Sibata Scientific Technology Ltd.), and liquid nitrogen was used to cause the surface of the spherical polymethylsilsesquioxane powder to adsorb nitrogen gas. Then, a BET surface area $S_X$ was obtained from the adsorption amount thereof by the BET one-point method. The mass of the measurement cell loaded with the spherical polymethylsilsesquioxane powder after the measurement was measured, and the previously measured mass of the measurement cell itself was subtracted from the resultant value to calculate the mass "m" of the spherical polymethylsilsesquioxane powder excluding the mass of moisture and the like desorbed through the pretreatment. The BET surface area $S_X$ was divided by the mass "m" to determine the specific surface area $S_1$. In this calculation, the BET surface area $S_X$ was used for the calculation after its numerical value expressed in the unit $m^2$ had been rounded off to an integer, and the mass "m" was used for the calculation after its numerical value expressed in the unit "g" had been rounded off to the second decimal place. Then, a value obtained by rounding off the thus calculated numerical value to the first decimal place was defined as the BET specific surface area $S_1$.

In addition, ρ and D50 to be used for the calculation of the specific surface area $S_2$ shown in the expression (1) were respectively measured as described below. In this case, the particle density ρ is measured using a dry automatic densimeter. The measurement was performed by the following procedure. First, spherical polymethylsilsesquioxane powder that had been subjected to drying treatment under reduced pressure at 120° C. for 24 hours was weighed in a 10 ml sample container to the nearest 0.0001 g. Next, the sample container was set in a measurement chamber of a dry automatic densimeter (AccuPly 1330 manufactured by Shimadzu Corporation), and then the particle density was measured at a measurement temperature of 25° C. while He gas was flowed into the measurement chamber. The dry automatic densimeter is configured to display the particle density to five decimal places in the unit $g/cm^3$ when the mass of the powder subjected to the measurement is input. Therefore, as the particle density ρ to be used for the calculation of the specific surface area $S_2$, there was used a numerical value obtained by further converting a numerical value, which had been obtained by rounding off the particle density expressed in $g/cm^3$ to the second decimal place, into a value expressed in $g/m^3$.

D50 is measured by a laser diffraction/scattering method. The measurement was performed by the following procedure. First, 0.1 g of dried spherical polymethylsilsesquioxane powder was loaded into a container made of glass (inner diameter: 4 cm, height: 11 cm), and then 50 g of 2-propanol was further added to provide a mixed liquid. Next, under a state in which part of a probe (inner diameter of end: 7 mm) of an ultrasonic disperser, the part ranging 4.5 cm from its end, was immersed in the mixed liquid, ultrasonic dispersion treatment was performed at an output of 20 W for 15 minutes to provide a dispersion liquid. Subsequently, the dispersion liquid was used to measure a volume-based 50% cumulative diameter (D50) with a particle size distribution measurement apparatus based on the laser diffraction/scattering method (manufactured by Beckman Coulter K.K., LS13 320). In the description of the present application, a volume-based 10% cumulative diameter (D10) and a volume-based 90% cumulative diameter (D90) are also measured by the same measurement method as with D50. In the above-mentioned LS13 320 manufactured by Beckman Coulter K.K., the particle diameter is expressed in the unit μm to six decimal places. However, in the description of the present application, a numerical value obtained by rounding off the particle diameter expressed to six decimal places to the second decimal place is adopted as the value of the particle diameter. Therefore, the value of the particle diameter (D50) to be used for the calculation of the specific surface area $S_2$ is used after the numerical value in the unit μm after the above-mentioned rounding off has been converted into the unit "m".

In addition, the particle according to this embodiment is spherical in shape. In the description of the present application, the phrase "the particle is spherical" means that, when the particle is observed by electron microscopy, the shape of the particle is recognizable as substantially truly spherical, and specifically means a circularity of preferably 0.80 or more, more preferably 0.90 or more, still more preferably 0.92 or more. In addition, the term "circularity" used in the definition of the phrase "the particle is spherical" refers to a 50% cumulative circularity. Herein, the term "50% cumulative circularity" means a 50th circularity as counted from a 1st circularity having the smallest value in the case where the circularity of each of 100 particles is measured and then the circularities of the 100 particles are sorted in ascending order. A value of the 50% cumulative circularity closer to 1 means that the shape of the particle is closer to a true sphere. When the 50% cumulative circularity is less than 0.80, adhesion between individual particles may be increased to deteriorate the disintegrability of an aggregate mass formed by aggregation of the individual particles.

The circularity of each individual particle required in the determination of the 50% cumulative circularity was calculated on the basis of the following equation (2). In addition, the circumference I and projected area $S_3$ of each individual particle required in the calculation of the circularity of the particle were measured by analyzing image data obtained by FE-SEM with image analysis software.

$$\text{Circularity}=4\pi\times(S_3/I^2) \quad \text{Equation (2)}$$

In the equation (2), I represents the circumference (nm) of a particle on an SEM image obtained by imaging the particle with a field-emission scanning electron microscope (FE-SEM), and $S_3$ represents the projected area ($nm^2$) of the particle on the SEM image.

The spherical polymethylsilsesquioxane particle according to this embodiment includes the particle main body containing at least a structure and groups described in the following items (a) to (c).

(a) A network structure formed by silicon atoms (n) and oxygen atoms (n) bonded to the silicon atoms (n)

(b) A methyl group bonded to at least one of the silicon atoms (n) (hereinafter sometimes referred to simply as “(b) the methyl group”)

(c) An alkoxyl group bonded to at least one of the silicon atoms (n) (hereinafter sometimes referred to simply as “(c) the alkoxyl group”)

In the description of the present application, the silicon atoms forming the network structure are referred to as “silicon atoms (n)”, and the oxygen atoms forming the network structure are referred to as “oxygen atoms (n)”. In addition, silicon atoms and oxygen atoms contained in groups (terminal groups) bonded to the silicon atoms (n) forming the network structure are sometimes referred to as silicon atoms (tg) and oxygen atoms (tg), respectively, so as to be distinguished from the silicon atoms (n) and the oxygen atoms (n). For example, the oxygen atom contained in (c) the alkoxyl group may be referred to as oxygen atom (tg). Herein, the silicon atoms (n) are each bonded to three oxygen atoms, and the oxygen atoms (n) are each bonded to two silicon atoms (n) in the network structure. In addition, such silicon atoms (n) and oxygen atoms (n) are bonded to each other like three-dimensional crosslinks, to thereby form the network structure. Each of the oxygen atoms to which the silicon atoms (n) are bonded is not always an oxygen atom (n), and may be an oxygen atom contained in (c) the alkoxyl group described above, or (d) a hydroxy group or (e) another group to be described later.

In addition, (c) the alkoxyl group bonded to at least one of the silicon atoms (n) is not particularly limited, but is preferably an alkoxyl group having 1 to 5 carbon atoms, more preferably an alkoxyl group having 1 to 3 carbon atoms, still more preferably a methoxy group or an ethoxy group, most preferably a methoxy group.

For reference, a general spherical polymethylsilsesquioxane particle of the related art has a basic structure represented by the following general formula (1). That is, as compared to the general spherical polymethylsilsesquioxane particle of the related art, a main structural feature of the particle according to this embodiment resides in the presence of (c) the alkoxyl group bonded to at least one of the silicon atoms (n).

$CH_3SiO_{3/2}$ General formula (1)

In addition, the particle main body may further contain, in addition to the structure and groups described in (a) to (c), (d) a hydroxy group bonded to at least one of the silicon atoms (n) (hereinafter sometimes referred to simply as “(d) the hydroxy group”), and/or (e) another group bonded to at least one of the silicon atoms (n) (hereinafter sometimes referred to simply as “(e) the other group”). Herein, (e) the other group refers to a group other than (b) the methyl group, (c) the alkoxyl group, and (d) the hydroxy group. (d) The hydroxy group and (e) the other group may be introduced into the particle main body by appropriately selecting a particle formation process of the particle main body or a surface treatment process after the completion of the particle formation process. For example, when the particle according to this embodiment is produced by adopting a particle formation process (first step to third step) to be described later, the particle main body contains the structure and groups described in (a) to (d) at the time of the completion of the third step. In addition, when a particle main body containing the structure and groups described in (a) to (d) is subjected to surface treatment using a surface treatment agent (e.g., hydrophobizing treatment using a hydrophobizing agent), the particle main body further contains, in the vicinity of the surface thereof, (e) the other group (group derived from the surface treatment agent/hydrophobizing agent).

In the particle according to this embodiment, the particle main body is not particularly limited as long as the particle main body contains at least the structure and groups described in (a) to (c), but three modes exemplified below are given as suitable combinations of the structure and groups to be contained in the particle main body.

<First Mode>

A first mode in which the particle main body substantially contains only (a) the network structure, (b) the methyl group, and (c) the alkoxyl group <Second Mode>

A second mode in which the particle main body substantially contains only (a) the network structure, (b) the methyl group, (c) the alkoxyl group, and (d) the hydroxy group <Third Mode>

A third mode in which the particle main body contains at least (a) the network structure, (b) the methyl group, (c) the alkoxyl group, and (e) the other group The first mode does not exclude a case in which the particle main body inevitably contains a small amount of (d) the hydroxy group and/or (e) the other group. In addition, the second mode does not exclude a case in which the particle main body inevitably contains a small amount of (e) the other group. Examples of the case in which the particle main body inevitably contains a small amount of (d) the hydroxy group and/or (e) the other group include: the presence of an impurity in the particle formation process of the particle main body; and a reaction with a contaminant or the like present in an environment in which the particle main body is stored. The particle main bodies of the first mode and the second mode may each be generally obtained by using a particle main body obtained through a particle formation process as it is, in other words, by not subjecting the surface of the particle main body to any surface treatment after the completion of the particle formation process.

In the description of the present application, the term “surface treatment” refers to allowing the surface of a particle main body obtained through a particle formation process to react with a surface treatment agent to chemically modify the surface of the particle main body with the surface treatment agent. In the surface treatment, a desired surface modification reaction can be achieved by appropriately selecting surface treatment conditions (e.g., the kind and concentration of the surface treatment agent, and reaction temperature/time). A typical example of the surface treatment agent is a hydrophobizing agent.

In the third mode, the particle main body may further contain (d) the hydroxy group. In addition, (e) the other group may be present at least in the vicinity of the surface of the particle main body. In this case, a specific example of (e) the other group is a group formed by surface treatment (e.g., a group formed by hydrophobizing treatment, such as a trialkylsilyloxy group). As a suitable variation of the third mode, there is given a case in which the particle main body contains, at least in the vicinity of the surface thereof, a trialkylsilyloxy group as (e) the other group. In this case, the carbon number of each of the alkyl groups contained in the trialkylsilyloxy group is preferably from 1 to 3, more preferably 1 (in other words, the other group is a trimethylsilyloxy group).

In the following description, the particle according to this embodiment in which the particle main body is not subjected to any surface treatment is sometimes referred to as "non-surface-treated particle", and the particle in which the particle main body is subjected to surface treatment with a hydrophobizing treatment agent is sometimes referred to as "hydrophobized particle".

In the particle according to this embodiment, the particle main body contains at least (b) the methyl group and (c) the alkoxyl group. In addition, (b) the methyl group and the alkyl group moiety of (c) the alkoxyl group show hydrophobicity, and hence the non-surface-treated particle tends to show hydrophobicity. In addition, as compared to the general spherical polymethylsilsesquioxane particle of the related art (provided that the particle that is not subjected to any surface treatment), which is represented by the general formula (1), the non-surface-treated particle further contains (c) the alkoxyl group. Accordingly, as compared to the general spherical polymethylsilsesquioxane particle of the related art (provided that the particle is not subjected to any surface treatment), the non-surface-treated particle is less liable to be influenced by humidity, and hence tends to be advantageous in terms of weatherability and environmental stability.

In addition, in the particle according to this embodiment, as required, the surface of the particle main body may be subjected to coating treatment with a coating agent, such as a silicone oil, or may not be subjected to any coating treatment. That is, the particle according to this embodiment may: (i) include the particle main body, which is formed of the non-surface-treated particle or the hydrophobized particle, and a coating layer covering the surface of the particle main body, or (ii) be formed only of the particle main body, which is formed of the non-surface-treated particle or the hydrophobized particle (in other words, free of any coating layer). In the description of the present application, the term "coating treatment" refers to coating of the surface of the particle main body with a coating layer formed of a coating agent. Herein, unlike the surface treatment agent, the coating agent means a material that does not undergo any chemical reaction with the surface of the particle main body.

Further, as described above, in the particle according to this embodiment, as groups bonded to the silicon atoms (n) forming (a) the network structure, the particle main body essentially contains at least (b) the methyl group and (c) the alkoxyl group, and may further contain (d) the hydroxy group or (e) the other group. In this connection, in the particle according to this embodiment, it is generally preferred that (b) the methyl group and (c) the alkoxyl group be present everywhere in the radial direction of the particle main body. Similarly, also when the particle according to this embodiment further contains (d) the hydroxy group, it is preferred that (d) the hydroxy group be present everywhere in the radial direction of the particle main body. Such structures can be easily achieved by a first or second production method to be described later.

Meanwhile, the degree of hydrophobicity (M value) of the particle according to this embodiment measured by a methanol titration method may be appropriately selected depending on use applications of the particle. The degree of hydrophobicity of the particle may be controlled within the range of from about 20 vol % to about 70 vol % by appropriately selecting: particle formation conditions; whether or not hydrophobizing treatment is performed; and hydrophobizing treatment conditions in the case where the hydrophobizing treatment is performed. For example, the non-surface-treated particle tends to show a relatively low degree of hydrophobicity within the above-mentioned range (e.g., within the range of from 25 vol % to 45 vol %), and the hydrophobized particle tends to show relatively high degree of hydrophobicity within the above-mentioned range (e.g., within the range of more than 45 vol % and 70 vol % or less). The lower limit value of the degree of hydrophobicity of the hydrophobized particle is more preferably 50 vol % or more, still more preferably 55 vol % or more, and the upper limit value thereof is preferably 65 vol % or less.

Particles each containing (d) the hydroxy group are liable to generate an aggregate in which the particles are firmly bonded to each other by hydrogen bonding. However, the hydrophobized particle can suppress the generation of such aggregate. Accordingly, the hydrophobized particle is excellent in fluidity, and is also excellent in dispersibility when the hydrophobized particle is dispersed and incorporated in any of various materials (in particularly, a resin material). In order to more effectively express such effect, it is effective to further increasing the degree of hydrophobicity, or to increase the amount of a group (e.g., a trialkylsilyloxy group) to be formed by the hydrophobizing treatment, the group being contained in the vicinity of the surface of the particle main body.

The degree of hydrophobicity (M value) is measured by a methanol titration method. The measurement is performed by the following procedure. First, a container (beaker) having a volume of 200 ml in which 50 ml of pure water and 0.2 g of spherical polymethylsilsesquioxane powder are placed is prepared. Next, until the whole amount of the spherical polymethylsilsesquioxane powder is brought into a state of being wetted and dispersed in the liquid, methanol is dropped from a burette into the container while the contents of the container are stirred. The value of the volume percentage of the amount of dropped methanol with respect to the total amount of pure water (50 ml) and dropped methanol at the time of the completion of the dropping is the degree of hydrophobicity (M value). A higher degree of hydrophobicity (M value) indicates higher hydrophobicity, and a lower value thereof indicates higher hydrophilicity.

(a) The network structure, (b) the methyl group, (c) the alkoxyl group, (d) the hydroxy group, and (e) the other group, or constituent atoms of the structure and the groups may be identified by known analysis means, such as NMR measurement or FT-IR measurement. Details of measurement utilizing NMR are described below.

<$^{13}$C DDMAS NMR>

The utilization of $^{13}$C DDMAS NMR measurement can provide information about carbon-containing groups contained in the particle main body ((b) the methyl group, (c) the alkoxyl group, and (e) the other group (provided that the other group is a carbon atom-containing group, such as a trialkylsilyloxy group)). Details of measurement conditions are described later, but when the measurement is performed using a peak (176.03 ppm) of the carbonyl of glycine as an external standard, such various kinds of information as exemplified below can be obtained.

<i> A peak of the carbon atom of (b) the methyl group is detected at around −4 ppm.

<ii> When (c) the alkoxyl group is a methoxy group, a peak based on the carbon atom bonded to the oxygen atom (tg) of (c) the alkoxyl group is detected at around −50 ppm.

<iii> When (e) the other group is a trimethylsilyloxy group, a peak based on the carbon atoms bonded to the silicon atom (tg) of the trimethylsilyloxy group is detected at around −1 ppm.

The same carbon atom has different detection peaks because of the influences of differences in, for example, the kind, number, and bonding states of atoms bonded to the carbon atom. For example, <i> the carbon atom of (b) the methyl group is bonded to one silicon atom (n) forming the network structure and three hydrogen atoms contained in the methyl group. In addition, <ii> the carbon atoms of the trimethylsilyloxy group serving as (e) the other group are each bonded to one silicon atom (tg) contained in the trimethylsilyloxy group, and three hydrogen atoms contained in a methyl group moiety of the trimethylsilyloxy group. The carbon atoms described in <i> and <ii> are identical in being bonded to one silicon atom and three hydrogen atoms. However, the silicon atom (n) bonded to the carbon atom described in <i> is bonded to two or three oxygen atoms (n), and the silicon atom (tg) bonded to each of the carbon atoms described in <ii> is bonded to three carbon atoms and one oxygen atom (tg).

Figure 2:
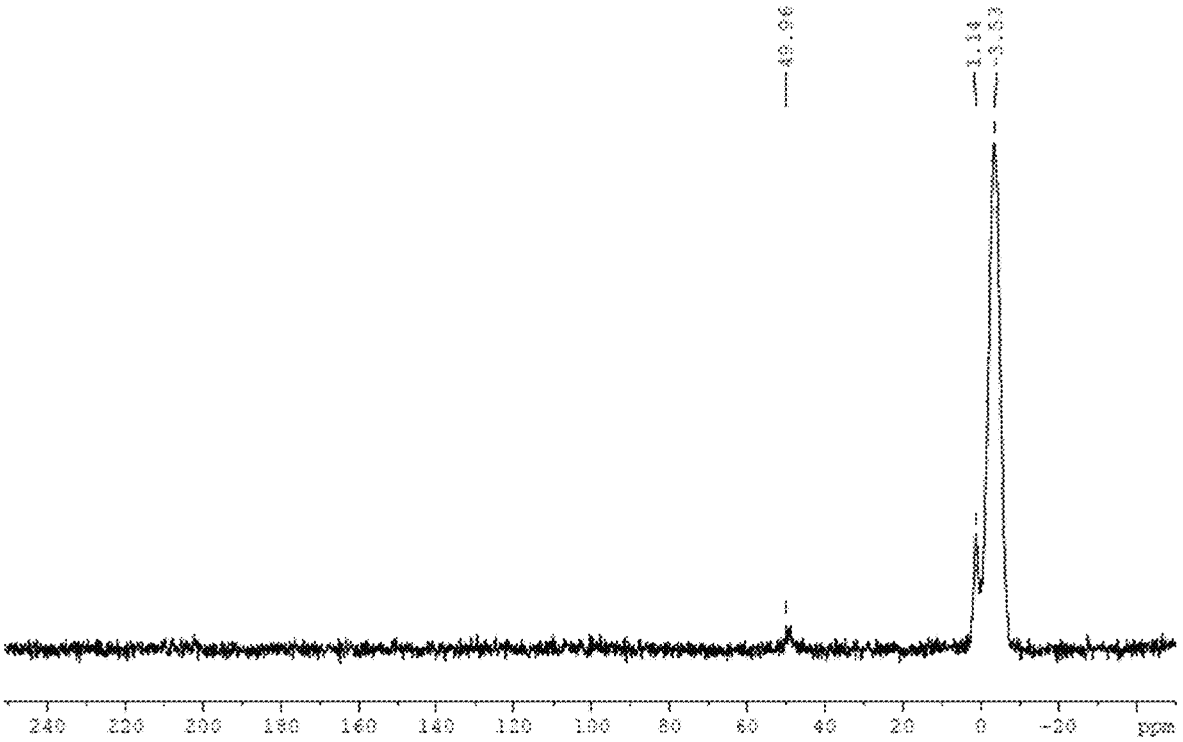
FIG. 2 is an NMR spectrum obtained by $^{13}C$ DDMAS NMR measurement of spherical polymethylsilsesquioxane particles (hydrophobized particles) of Example B1.

For reference, FIG. 1 and FIG. 2 each show an example of an NMR spectrum obtained by $^{13}$C DDMAS NMR measurement of the particle according to this embodiment. Particles used for the NMR measurement of FIG. 1 are particles (non-surface-treated particles) of Example A2 to be described later, and particles used for the NMR measurement of FIG. 2 are particles (hydrophobized particles) of Example B1 to be described later. In the NMR spectrum shown in FIG. 1, a peak of a carbon atom derived from (b) the methyl group can be recognized at around −4 ppm, and a peak of a carbon atom derived from (c) the methoxy group can be recognized at around −50 ppm. In addition, in the NMR spectrum shown in FIG. 2, a peak of a carbon atom derived from (b) the methyl group can be recognized at around −4 ppm, a peak of a carbon atom derived from (c) the methoxy group can be recognized at around −50 ppm, and a peak of carbon atoms derived from (e) the trimethylsilyloxy group can be recognized at around −1 ppm.

As described above, through utilization of $^{13}$C DDMAS NMR measurement, (b) the methyl group, (c) the alkoxyl group, and (e) the other group that contains a carbon atom (e.g., a trialkylsilyloxy group) can be distinguished from each other. In the following description, in the case where $^{13}$C DDMAS NMR measurement is performed, the area of a peak "a" derived from a carbon atom contained in (c) the alkoxyl group (the carbon atom is a carbon atom bonded to the oxygen atom (tg) contained in (c) the alkoxyl group) is represented by A, the area of a peak "b" derived from the carbon atom contained in (b) the methyl group is represented by B, and when (e) the other group is a trialkylsilyloxy group, the area of a peak "c" derived from carbon atoms bonded silicon atom (tg) of the trialkylsilyloxy group is represented by C.

In this case, a peak area ratio (A/B) is a parameter meaning a relative ratio of the total amount of (c) the alkoxyl group with respect to the total amount of (b) the methyl group serving as a reference value. In the particle according to this embodiment, the ratio A/B is not particularly limited as long as the ratio is more than 0, but falls within preferably the range of from 0.016 to 0.030, more preferably the range of from 0.020 to 0.030. In addition, the hydrophobized particle has a peak area ratio (C/(A+B+C)) as expressed in % of preferably 2.0% or more, more preferably 4.0% or more, still more preferably 6.0% or more.

<$^{29}$Si DDMAS NMR>

The utilization of $^{29}$Si DDMAS NMR measurement can provide information about the silicon-containing network structure and group contained in the particle main body ((a) the network structure and (e) the other group (provided that the other group is a silicon atom (tg)-containing group, such as a trialkylsilyloxy group)). Details of measurement conditions are described later, but when the measurement is performed using a peak (34 ppm) of polydimethylsilane as an external standard, such various kinds of information as exemplified below can be obtained.

<i> A peak of silicon atoms (n) forming (a) the network structure each of which satisfies the following conditions is detected at around −56 ppm.

That is, of the four bonding sites of a silicon atom (n) forming (a) the network structure, (1) two bonding sites are bonded to oxygen atoms (n) forming (a) the network structure, (2) one bonding site is bonded to the carbon atom of (b) the methyl group, and (3) one bonding site is bonded to the oxygen atom (tg) of a methoxy group serving as (c) the alkoxyl group, or the oxygen atom (tg) of (d) the hydroxy group.

<ii> A peak of silicon atoms (n) forming (a) the network structure each of which satisfies the following conditions is detected at around −65 ppm.

That is, of the four bonding sites of a silicon atom (n) forming (a) the network structure, (1) three bonding sites are bonded to oxygen atoms (n) forming (a) the network structure, and (2) one bonding site is bonded to the carbon atom of (b) the methyl group.

<iii> When (e) the other group is a trimethylsilyloxy group, a peak based on the silicon atom (tg) of the trimethylsilyloxy group is detected at around −8 ppm.

The silicon atoms (n) described in <i> above each correspond to a silicon atom indicated by symbol D in the following structural formula (1), and the silicon atoms (n) described in <ii> above each correspond to a silicon atom indicated by symbol E in the following structural formula (2). In the following structural formula (1), $R^1$ represents (c) the alkoxyl group or (d) the hydroxy group.

Structural formula (1)

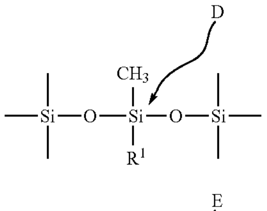

Structural formula (2)

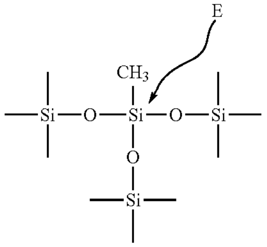

Figure 3:
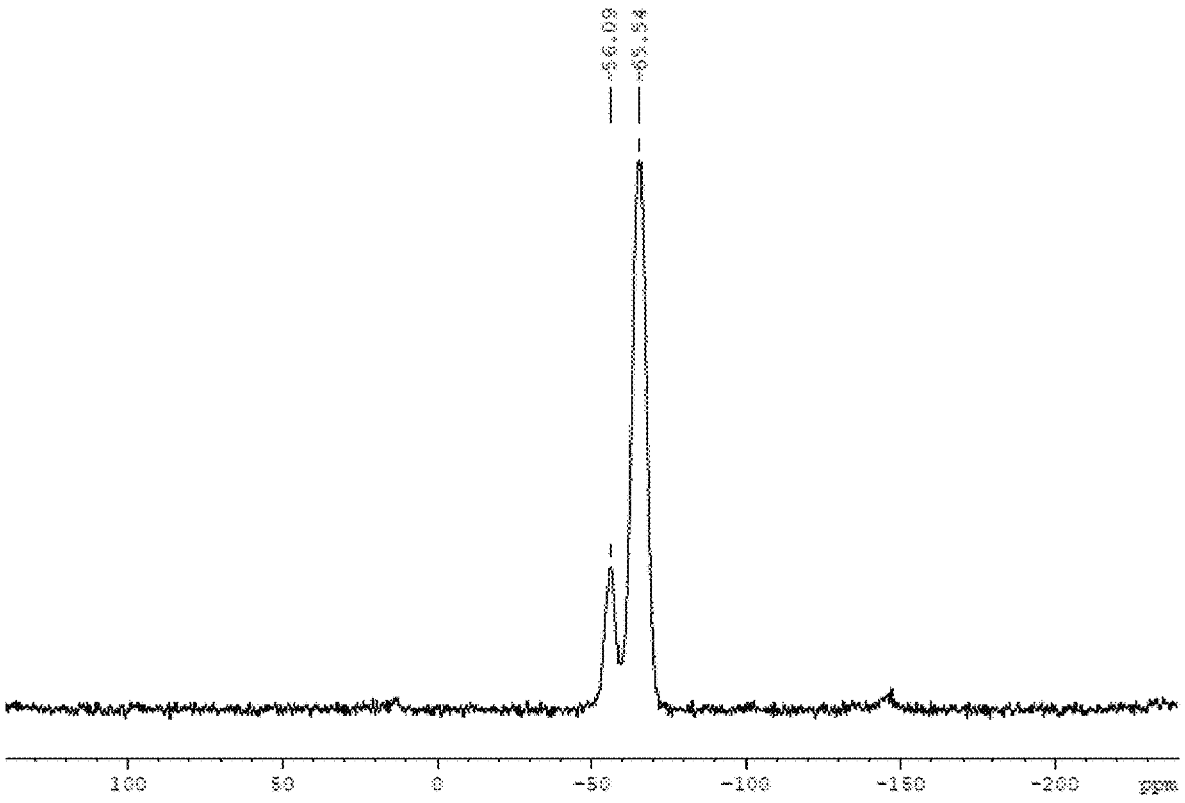
FIG. 3 is an NMR spectrum obtained by $^{29}Si$ DDMAS NMR measurement of the spherical polymethylsilsesquioxane particles (non-surface-treated particles) of Example A2.
Figure 4:
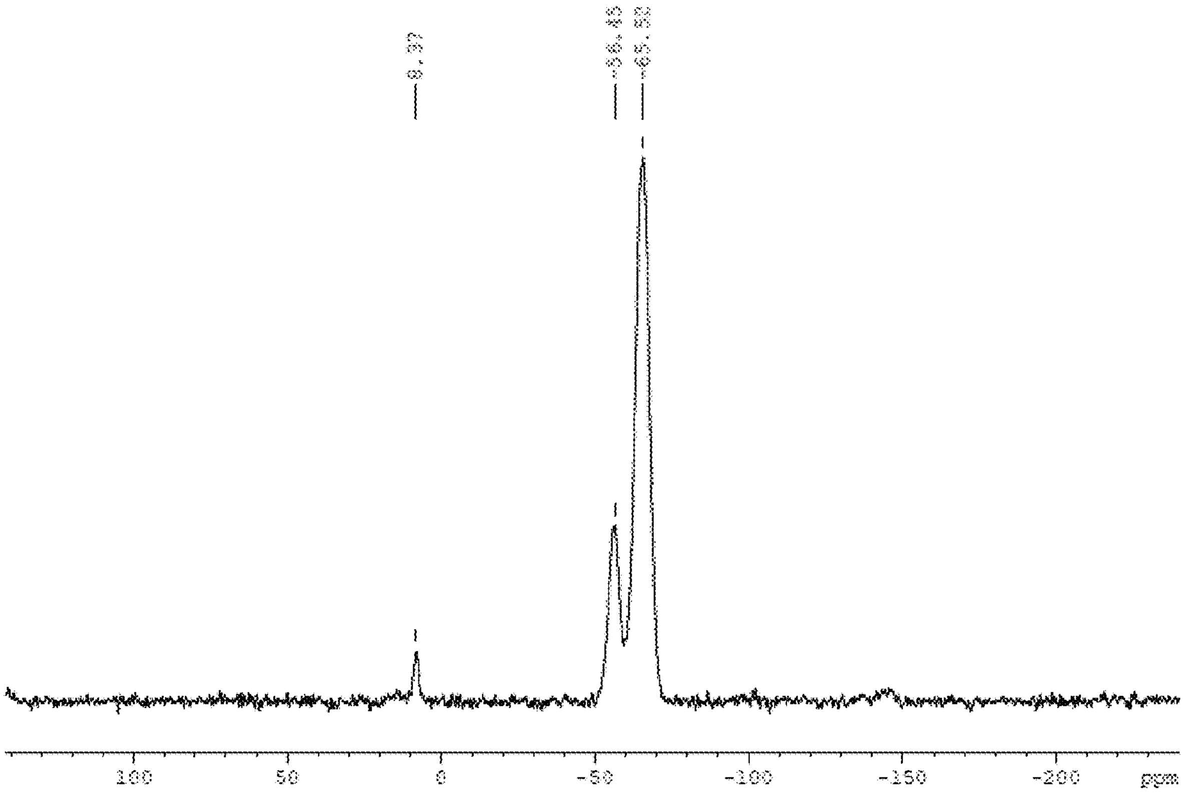
FIG. 4 is an NMR spectrum obtained by $^{29}Si$ DDMAS NMR measurement of the spherical polymethylsilsesquioxane particles (hydrophobized particles) of Example B1.

For reference, FIG. 3 and FIG. 4 each show an example of an NMR spectrum obtained by $^{29}$Si DDMAS NMR measurement of the particle according to this embodiment. Particles used for the NMR measurement of FIG. 3 are particles (non-surface-treated particles) of Example A2 to be described later, and particles used for the NMR measurement of FIG. 4 are particles (hydrophobized particles) of Example B1 to be described later. In the NMR spectrum shown in FIG. 3, a peak of the silicon atoms (n) forming (a) the network structure described in <i> above can be recognized at around −56 ppm, and a peak of the silicon atoms (n) forming (a) the network structure described in <ii> above can be recognized at around −65 ppm. In addition, in the NMR spectrum shown in FIG. 4, a peak of the silicon atoms (n) forming (a) the network structure described in <i> above can be recognized at around −56 ppm, a peak of the silicon atoms (n) forming (a) the network structure described in <ii> above can be recognized at around −65 ppm, and a peak of the silicon atom (tg) of (e) the trimethylsilyloxy group can be recognized at around −8 ppm.

As described above, through utilization of $^{29}$Si DDMAS NMR measurement, silicon atoms (n) in bonding states different from each other in (a) the network structure can be distinguished from each other, and (e) the other group that contains a silicon atom (e.g., a trialkylsilyloxy group) can be distinguished. In the following description, in the case where $^{29}$Si DDMAS NMR measurement is performed, the area of a peak "d" derived from the silicon atoms (n) described in <i> above is represented by D, and the area of a peak "e" derived from the silicon atoms (n) described in <ii> above is represented by E.

Such various parameters of technical significance as exemplified below can be obtained by appropriately combining the areas A to E of the peak "a" to "e".

$$D+E \tag{1}$$

The silicon atoms (n) described in <i> and <ii> are each invariably bonded to one (b) methyl group. Accordingly, the sum (D+E) of the two peak areas is also a parameter corresponding to the total amount of (b) the methyl group.

$$F=D/(D+E) \tag{2}$$

The silicon atoms (n) described in <i> are each invariably bonded to (c) the alkoxyl group or (d) the hydroxy group. Accordingly, the area D is also a parameter corresponding to the total amount of (c) the alkoxyl group and (d) the hydroxy group. Then, in view of (1) above as well, F=D/(D+E) is a parameter (functional group ratio) meaning a relative ratio of the total amount of (c) the alkoxyl group and (d) the hydroxy group with respect to the total amount of (b) the methyl group serving as a reference value.

$$G=(A/B)/F \tag{3}$$

A/B is a parameter meaning a relative ratio of the total amount of (c) the alkoxyl group with respect to the total amount of (b) the methyl group serving as a reference value, and F is a parameter (functional group ratio) meaning a relative ratio of the total amount of (c) the alkoxyl group and (d) the hydroxy group with respect to the total amount of (b) the methyl group serving as a reference value. Accordingly, a value G obtained by dividing A/B by F is a parameter meaning a relative ratio of the total amount of (c) the alkoxyl group with respect to the total amount of (c) the alkoxyl group and (d) the hydroxy group serving as a reference value. Thus, a larger value of G means a larger relative ratio of (c) the alkoxyl group, and a smaller value of G means a larger relative ratio of (d) the hydroxy group. A/B and F are parameters obtained on the basis of the areas of peaks obtained by measurement methods different from each other. Therefore, when G is to be calculated, the value of A/B and the value of F need to be calculated in advance.

In the particle according to this embodiment, G may take any value within the range of more than 0 and 1 or less, but falls within preferably the range of from 0.05 to 0.15, more preferably the range of from 0.06 to 0.15, still more preferably the range of from 0.09 to 0.13.

The particle diameter (50% cumulative diameter (D50)) of the particle according to this embodiment is not particularly limited, and may be appropriately selected depending on use applications of the particle. However, in view of producibility, handleability, and various conceivable applications of the particle, the particle diameter may be appropriately selected within the range of from about 0.1 μm to about 10 μm. In general, the lower limit value of the particle diameter is preferably 0.14 μm or more, more preferably 0.16 μm or more, 0.18 μm or more, or 0.25 μm or more, still more preferably more than 0.3 μm, particularly preferably 0.35 μm or more. In addition, in general, the upper limit value of the particle diameter is preferably 2.0 μm or less, more preferably 1.5 μm or less, still more preferably 1.1 μm or less, particularly preferably 1.0 μm or less. In addition, a suitable range of the particle diameter obtained by combining an upper limit value and a lower limit value may be a range obtained by appropriately combining the upper limit values and lower limit values listed above, and examples thereof may include: the range of from 0.14 μm to 2.0 μm; the range of more than 0.30 μm and 2.0 μm or less; and the range of from 0.35 μm to 1.1 μm.

In addition, irrespective of use applications and purposes of the particle according to this embodiment, the particle diameter (D50) and $S_1/S_2$ generally preferably satisfy a relationship shown in the following expression (3), and more preferably satisfy the following expression (4).

$$S_1/S_2 \geq 44.5 \times D50+2.07 \qquad \text{Expression (3)}$$

$$S_1/S_2 \geq 57.5 \times D50+1.47 \qquad \text{Expression (4)}$$

In the expression (3) and the expression (4), the unit of D50 is μm, and the unit of $S_1/S_2$ is dimensionless. In the expression (3), the lower limit value of D50 is preferably 0.14 μm or more, more preferably 0.2 μm or more, particularly preferably more than 0.3 μm. In addition, in the expression (4), the lower limit value of D50 is preferably 0.12 μm or more, more preferably 0.2 μm or more, particularly preferably more than 0.3 μm.

In addition, the particle diameter may also be appropriately selected with attention focused on the action and effect of the particle according to this embodiment, or depending on applications of the particle according to this embodiment. For example, when the particle according to this embodiment is used as a filling material for any of various rubbers and resins, the particle diameter is preferably 0.14 μm or more from the viewpoint of securing viscosity and fluidity at the time of the addition of the particle according to this embodiment to, for example, a resin in a molten state. In addition, when a rubber material or resin material having the particle according to this embodiment dispersed and incorporated therein is to be produced, the particle diameter is preferably 2.0 μm or less from the viewpoint of securing transparency of such material.

In addition, from the viewpoint of improving the adhesiveness of the particle to a solid surface, the expression (3) is preferably satisfied, and the expression (4) is more preferably satisfied. In this case, in the expression (3), the lower limit value of D50 is preferably 0.14 μm or more, more preferably 0.2 μm or more, particularly preferably more than 0.3 μm. In addition, in the expression (4), the lower limit value of D50 is preferably 0.12 μm or more, more preferably 0.2 μm or more, particularly preferably more than 0.3 μm.

The width of the particle size distribution of the particle according to this embodiment may be expressed using the ratio (D90/D10) of a 90% cumulative diameter (D90) to a 10% cumulative diameter (D10). A smaller value of D90/D10 means a narrower width of the particle size distribution, and higher monodispersibility. In the particle according to this embodiment, the value of D90/D10 is not particularly limited and may be appropriately selected depending on applications, but in general, is preferably smaller, specifically, preferably from 1.5 to 7.0, more preferably 5.5 or less.

Next, a production method for the particle according to this embodiment is described. The production method for the particle according to this embodiment is not particularly limited, but when the particle according to this embodiment is a non-surface-treated particle, the first production method described below is suitable, and when the particle according to this embodiment is a hydrophobized particle, the second production method described below is suitable.

In this connection, in the first production method, the non-surface-treated particle may be obtained by performing a first step to a third step (particle formation process) and then collecting a solid from the resultant spherical polymethylsilsesquioxane particle dispersion liquid. In addition, in the second production method, the hydrophobized particle may be obtained by performing the first step to the third step (particle formation process), then further performing a fourth step (hydrophobizing treatment), and collecting a solid from the thus obtained spherical polymethylsilsesquioxane particle dispersion liquid after the hydrophobizing treatment. The outlines of the first step to the fourth step are as described below.

(First Step)

A raw material solution containing a particle precursor selected from the group consisting of (i) a hydrolysate of a methyltrialkoxysilane, (ii) a partial condensate of the hydrolysate, and (iii) a mixture of the hydrolysate and the partial condensate, and an organic solvent (first organic solvent) is obtained.

(Second Step)

The raw material solution is mixed with an alkaline aqueous medium containing an organic solvent (second organic solvent) to subject the particle precursor to a polycondensation reaction, to thereby obtain a polycondensation reaction liquid.

(Third Step)

Next, the polycondensation reaction liquid is mixed with an aqueous solution containing an organic solvent (third organic solvent), whose organic solvent concentration is 5 mass % or more and 48 mass % or less, to thereby obtain a spherical polymethylsilsesquioxane particle dispersion liquid having dispersed therein a spherical polymethylsilsesquioxane particle. In this case, the mixing of the polycondensation reaction liquid with the aqueous solution is performed so that the ratio of organic solvents (total of the first to third organic solvents) contained in the mixed solution obtained by mixing the polycondensation reaction liquid with the aqueous solution may be a ratio of more than 35 mass % and 60 mass % or less.

(Fourth Step)

A hydrophobizing agent is blended in the spherical polymethylsilsesquioxane particle dispersion liquid to subject the surface of the spherical polymethylsilsesquioxane particle to hydrophobizing treatment.

The first production method is substantially identical to a production method disclosed in WO 2015/107961 A1 except for differences in conditions under which the third step is performed and whether or not the fourth step is performed, and the second production method is substantially identical to the production method disclosed in WO 2015/107961 A1 except for differences in conditions under which the third step is performed. However, with regard to the third step, the first and second production methods remarkably differ from the production method disclosed in WO 2015/107961 A1 in the following items (i) and (ii) and a combination thereof. Details of each step are described below.

(i) An aqueous solution containing an organic solvent, whose organic solvent concentration is 5 mass % or more and 48 mass % or less, is used.

(ii) The ratio of organic solvents in the mixed solution obtained by mixing the polycondensation reaction liquid with the aqueous solution is more than 35 mass % and 60 mass % or less.

In the first step, a methyltrialkoxysilane serving as a raw material is hydrolyzed in the presence of an acid catalyst to obtain a raw material solution containing a particle precursor selected from the group consisting of (i) a hydrolysate of the methyltrialkoxysilane, (ii) a partial condensate of the hydrolysate, and (iii) a mixture of the hydrolysate and the partial condensate, and an organic solvent.

Herein, the methyltrialkoxysilane is a compound represented by the following general formula (2).

$CH_3Si(OR^2)_3$ General formula (2)

In the general formula (2), $R^2$ represents any one of an alkyl group or a cyclic alkyl group.

Examples of the methyltrialkoxysilane may include methyltrimethoxysilane, methyltriethoxysilane, methyltriisopropoxysilane, and methyltris(methoxyethoxy)silane. One kind of those methyltrialkoxysilanes may be used alone, or two or more kinds thereof may be used in combination.

A known catalyst may be suitably used as the catalyst. Specific examples thereof include: inorganic acids, such as hydrochloric acid, nitric acid, and sulfuric acid; and organic acids, such as formic acid, acetic acid, oxalic acid, citric acid, and propionic acid.

The usage amount of the catalyst may be appropriately adjusted depending on the kinds of the methyltrialkoxysilane and the acid, and is selected from the range of from $1\times10^{-3}$ part by mass to 1 part by mass with respect to 100 parts by mass of the amount of water to be used in the hydrolysis of the methyltrialkoxysilane. When the usage amount of the catalyst is less than $1\times10^{-3}$ part by mass, the reaction does not sufficiently proceed, and when the usage amount is more than 1 part by mass, not only the concentration of the catalyst remaining as an impurity in the particle is increased, but also the generated hydrolysate is liable to be condensed. The usage amount of water is preferably from 2 mol to 15 mol with respect to 1 mol of the methyltrialkoxysilane. When the amount of water is less than 2 mol, the hydrolysis reaction does not sufficiently proceed, and the use of water in an amount of more than 15 mol may deteriorate productivity.

A reaction temperature is not particularly limited, and the reaction may be performed at ordinary temperature or under a heated state. The reaction is preferably performed under a state in which the temperature is kept at from 10° C. to 60° C. because the hydrolysate is obtained in a short period of time and the partial condensation reaction of the generated hydrolysate can be suppressed. A reaction time is not particularly limited, and may be appropriately selected in consideration of the reactivity of the methyltrialkoxysilane to be used, the composition of the reaction liquid obtained by blending the methyltrialkoxysilane, the acid, and water, and productivity. However, the reaction time is generally from about 10 minutes to about 10 hours.

Through such operation, the alkoxy of at least part of the methyltrialkoxysilane is hydrolyzed to generate an alcohol. Accordingly, the resultant raw material solution contains the alcohol (first organic solvent) in addition to the particle precursor generated by the hydrolysis and condensation of the methyltrialkoxysilane. The hydrolysis of the methyltrialkoxysilane may be performed in the presence of a separately added organic solvent. In this case, the separately added organic solvent is also included in the first organic solvent.

In the second step, the raw material solution obtained in the first step is mixed with an alkaline aqueous medium containing an organic solvent (second organic solvent) to subject the particle precursor to a polycondensation reaction. Thus, a polycondensation reaction liquid is obtained. In this case, the alkaline aqueous medium is a liquid obtained by mixing an alkali component, water, and an organic solvent.

The alkali component to be used for the alkaline aqueous medium is as follows: its aqueous solution shows basicity and the alkali component acts as a neutralizing agent for the acid used in the first step and as a catalyst for the polycondensation reaction in the second step. Examples of such alkali component may include: alkali metal hydroxides, such as lithium hydroxide, sodium hydroxide, and potassium hydroxide; ammonia; organic amines, such as monomethylamine and dimethylamine; and quaternary ammonium hydroxides, such as tetramethylammonium hydroxide, tetraethylammonium hydroxide, and choline.

In the second step, in order to prepare the alkaline aqueous medium, an organic solvent is further used in addition to the alkali component and water. Such organic solvent is not particularly limited as long as the organic solvent has compatibility with water, but an organic solvent capable of dissolving 10 g or more of water per 100 g under ordinary temperature and ordinary pressure is suitable. Examples of the solvent may include: alcohols, such as methanol, ethanol, n-propanol, 2-propanol, and butanol; polyhydric alcohols, such as ethylene glycol, diethylene glycol, propylene glycol, glycerin, trimethylolpropane, and hexanetriol; ketones, such as acetone, methyl ethyl ketone, and diacetone alcohol; ethers, such as ethylene glycol monoethyl ether, diethyl ether, and tetrahydrofuran; and amide compounds, such as dimethylformamide, dimethylacetamide, and N-methylpyrrolidone. The content percentage of the organic solvent is preferably 50 mass % or more, and is preferably 90 mass % or less.

The usage amount of the alkali component is such an amount that the alkali component neutralizes the acid and effectively acts as the catalyst for the polycondensation reaction. For example, when ammonia is used as the alkali component, the usage amount is generally selected from the range of 0.01 mass % or more and 12.5 mass % or less with respect to 100 parts by mass of the mixture of water and the organic solvent. When the usage amount of the alkali component is less than 0.01 mass %, in the subsequent third step, the spherical polymethylsilsesquioxane particle is difficult to obtain and its yield is liable to be reduced. In addition, when the usage amount of the alkali component is more than 12.5 mass %, a precipitate is liable to be generated, and hence a homogeneous reaction liquid is difficult to obtain, with the result that, in the subsequent third step, the generation of the spherical polymethylsilsesquioxane particle may become unstable. In addition, the treatment of a waste liquid is liable to be complicated.

The mixing amount of the alkaline aqueous medium preferably falls within such a range that the concentration of the particle precursor is from 1 mass % to 20 mass %. The concentration of the particle precursor is calculated on the assumption that the whole amount of the methyltrialkoxysilane serving as the raw material has completely reacted.

The reaction time of the polycondensation reaction liquid is appropriately determined in consideration of, for example, a reaction temperature, the composition of the raw material solution, and the composition of the alkaline aqueous medium, and is specifically, equal to or longer than a period of time in which turbidity is generated in a transparent reaction liquid immediately after mixing and shorter than a period of time in which a precipitate starts to be generated in the reaction liquid. An excessively short mixing time and an excessively long mixing time are each liable to cause a problem in that the spherical polymethylsilsesquioxane particle to be obtained in the subsequent third step is reduced in sphericity or generates an aggregate.

In the third step, the polycondensation reaction liquid obtained in the second step is mixed with an aqueous solution containing an organic solvent (third organic solvent), to thereby obtain a spherical polymethylsilsesquioxane particle dispersion liquid having dispersed therein a spherical polymethylsilsesquioxane particle.

The organic solvent to be used for the aqueous solution containing an organic solvent with which the polycondensation reaction liquid is to be mixed is not particularly limited as long as the organic solvent has compatibility with water, but an organic solvent capable of dissolving 10 g or more of water per 100 g under ordinary temperature and ordinary pressure is suitable. Examples of the organic solvent may include: alcohols, such as methanol, ethanol, n-propanol, 2-propanol, and butanol; polyhydric alcohols, such as ethylene glycol, diethylene glycol, propylene glycol, glycerin, trimethylolpropane, and hexanetriol; ketones, such as acetone, methyl ethyl ketone, and diacetone alcohol; ethers, such as ethylene glycol monoethyl ether, acetone, diethyl ether, and tetrahydrofuran; and amide compounds, such as dimethylformamide, dimethylacetamide, and N-methylpyrrolidone.

In this case, in order to obtain the particle according to this embodiment, conditions shown in the following items (i) and (ii) need to be simultaneously satisfied. With this, a particle having an $S_1/S_2$ of 8.0 or more can be easily obtained.

(i) An aqueous solution containing an organic solvent, whose organic solvent concentration is 5 mass % or more and 48 mass % or less, is used.

(ii) The ratio of organic solvents in the mixed solution obtained by mixing the polycondensation reaction liquid with the aqueous solution is more than 35 mass % and 60 mass % or less.

In this case, the content of organic solvents in the mixed solution corresponds to the total content of: the organic solvent contained in the raw material solution prepared in the first step (first organic solvent); the organic solvent contained in the alkaline aqueous medium to be used in the second step (second organic solvent); and the organic solvent contained in the aqueous solution to be used in the third step (third organic solvent). The mixed solution generally contains, in addition to liquid components, a particle (solid component) to be generated along with a lapse of time. In addition, the whole amount (100 mass %) of the mixed solution corresponds to the total amount of all raw materials used in the first step to the third step.

The organic solvent concentration of the aqueous solution is preferably from 10 mass % to 48 mass %, more preferably from 18 mass % to 48 mass %, still more preferably from 25 mass % to 45 mass %. In addition, the ratio of organic solvents in the mixed solution after the completion of the mixing of the whole amounts of the polycondensation reaction liquid and the aqueous solution is preferably 38 mass % or more, more preferably 45 mass % or more. In addition, to the extent that the above-mentioned condition (ii) is satisfied, the mixing amount of the aqueous solution containing an organic solvent preferably falls within the range of from 0.25 to 10 times as large as that of the polycondensation reaction liquid in terms of mass.

As the organic solvent concentration of the aqueous solution and/or the ratio of the organic solvents in the mixed solution increases in the third step, the particle diameter (D50) of the particle to be obtained after aging treatment to be described later tends to be larger.

A method of mixing the polycondensation reaction liquid with the aqueous solution containing an organic solvent is not particularly limited, and a known method may be adopted. However, the mixing is preferably performed in the following manner.

That is, the polycondensation reaction liquid is mixed with the aqueous solution containing an organic solvent so that the composition of a mixed solution obtained by mixing the polycondensation reaction liquid with the aqueous solution containing an organic solvent is always kept constant with respect to a lapse of time. With this, it becomes easy to sufficiently narrow the particle size distribution of spherical polymethylsilsesquioxane powder in the spherical polymethylsilsesquioxane particle dispersion liquid to be obtained.

When the mixing of the polycondensation reaction liquid with the aqueous solution containing an organic solvent is insufficient, spherical polymethylsilsesquioxane particles to be generated are liable to be aggregated, resulting in an $S_1/S_2$ of less than 8.0.

Specific examples of the mixing method include: i) a method involving supplying the polycondensation reaction liquid from a polycondensation reaction liquid-supplying tube to an empty container, and at the same time, supplying the aqueous solution from an aqueous solution-supplying tube thereto to mix the polycondensation reaction liquid with the aqueous solution in the container; and ii) a method involving mixing the polycondensation reaction liquid with the aqueous solution through use of a trifurcate tube.

Of those, a mixing method involving using a tubular reactor including a trifurcate tube, such as a Y-shaped tube or a T-shaped tube, is preferred. In this case, from the viewpoint of, for example, the stability of the flow amount, a Y-shaped tubular reactor including a constricted portion arranged in each of flow passages (first flow passage and second flow passage) for supplying liquids to the connecting portion as disclosed in JP 2003-221222 A and JP 6116711 B2 is preferably used.

Figure 5:
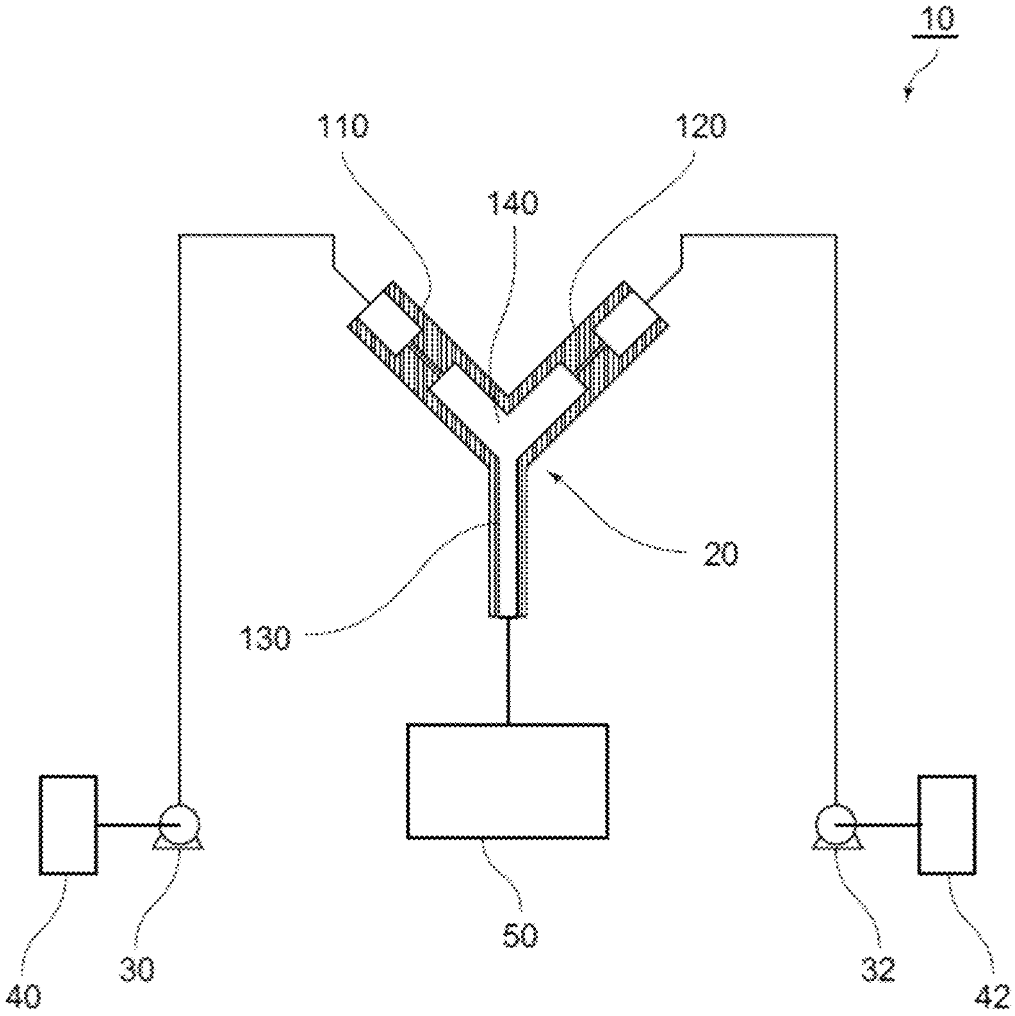
FIG. 5 is a general schematic view for illustrating an example of a reaction apparatus to be used for the production of a spherical polymethylsilsesquioxane particle according to one embodiment of the present invention.
Figure 6:
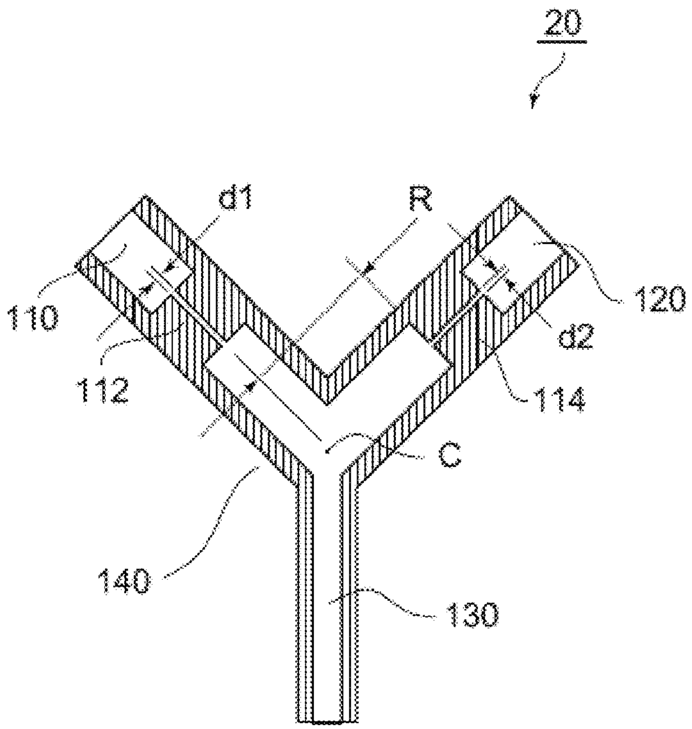
FIG. 6 is an enlarged cross-sectional view for illustrating an example of the cross-sectional structure of a tubular reactor illustrated in FIG. 5.

FIG. 5 is a general schematic view for illustrating an example of a reaction apparatus to be used in the method of producing the spherical polymethylsilsesquioxane_particle according to this embodiment, and FIG. 6 is an enlarged cross-sectional view for illustrating an example of the cross-sectional structure of a tubular reactor illustrated in FIG. 5. A reaction apparatus 10 illustrated in FIG. 5 includes: a Y-shaped trifurcate tubular reactor 20 including a first flow passage 110, a second flow passage 120, a third flow passage 130, and a connecting portion 140 at which ends of the three flow passages 110, 120, and 130 on one side are connected to each other; a first pump 30 connected to the inlet side of the first flow passage 110 (end side opposite to the connecting portion 140); a second pump 32 connected to the inlet side of the second flow passage 120 (end side opposite to the connecting portion 140); a first raw material tank 40 connected to the first pump 30; a second raw material tank 42 connected to the second pump 32; and a collection tank 50 connected to the outlet side of the third flow passage 130 (end side opposite to the connecting portion 140).

When the third step is performed using the reaction apparatus 10 illustrated in FIG. 5, for example, the polycondensation reaction liquid stored in the first raw material tank 40 is continuously supplied via the first pump 30 in a constant flow amount to the first flow passage 110, and the aqueous solution stored in the second raw material tank 42 is continuously supplied via the second pump 32 in a constant flow amount to the second flow passage 120. With this, in the connecting portion 140, the polycondensation reaction liquid and the aqueous solution are mixed simultaneously with their collision. Then, the mixed liquid of the polycondensation reaction liquid and the aqueous solution is collected from the connecting portion 140 side via the third flow passage 130 into the collection tank 50 as the spherical polymethylsilsesquioxane particle dispersion liquid. The mixed liquid discharged from the third flow passage 130 may be further stirred and mixed by being passed through a static mixer or the like. In this case, the flow rate of each of the polycondensation reaction liquid and the aqueous solution in the tubular reactor can be set to be higher, and hence higher productivity can be obtained.

The liquid delivery of the polycondensation reaction liquid and the aqueous solution to the trifurcate tubular reactor 20 may adopt any of known liquid delivery techniques other than the pumps 30 and 32, such as pressure feed, without any limitation. Of those, pressure feed, which can subject the polycondensation reaction liquid and the aqueous solution to collisional mixing continuously and homogeneously, is preferred. In addition, when the pumps 30 and 32 are used, multiple reciprocating pumps, which generate no pulsation, or pumps with damping apparatus, such as accumulators, are suitably used.

In addition, from the viewpoint of making it easier to obtain a spherical polymethylsilsesquioxane_particle having a desired particle diameter and particle size distribution, it is preferred that, as illustrated in FIG. 6, the constricted portions 112 and 114 each capable of adjusting a flow rate be arranged in the first flow passage 110 and in the second flow passage 120, respectively. In this case, a distance R from the flow outlet side (connecting portion 140 side) of the constricted portions 112 and 114 to a central point C of the connecting portion 140 is preferably from 1 to 25 times, more preferably from 1 to 9 times as large as a constricted portion diameter d1 of the constricted portion 112 or a constricted portion diameter d2 of the constricted portion 114. In addition, the distance R from the flow outlet side (connecting portion 140 side) of the constricted portion 112 to the central point C, and the distance R from the flow outlet side (connecting portion 140 side) of the constricted portion 114 to the central point C are preferably equal to each other.

The mixed solution obtained by mixing the polycondensation reaction liquid with the aqueous solution containing an organic solvent needs to be left at rest for a while (aging treatment). The aging treatment can stabilize the spherical polymethylsilsesquioxane particle to be generated in the mixed solution, and provide a particle having a larger $S_1/S_2$.

An aging temperature and an aging time are not particularly limited as long as a particle having an $S_1/S_2$ of 8.0 or more is obtained, and only need to be adjusted so as to provide preferred physical properties depending on applications of the particle according to this embodiment. However, the aging temperature needs to be equal to or higher than the freezing temperature of the mixed solution, and, from the standpoint of making forced cooling unnecessary, is preferably 10° C. or more, more preferably 15° C. or more, particularly preferably 18° C. or more. In addition, from the viewpoint of preventing components contained in the mixed solution from volatilizing, the aging temperature is preferably 60° C. or less, more preferably 50° C. or less, and is particularly preferably 40° C. or less from the standpoint that heating can be made unnecessary. In addition, for example, the aging time in the case where aging is performed at 20° C. is particularly preferably at least 6 hours or more from the viewpoint of more reliably obtaining a particle having an $S_1/S_2$ of 8.0 or more. The aging time in the case where aging is performed at 20° C. is more preferably 15 hours or more, preferably 20 hours or more, more preferably 24 hours or more, still more preferably 160 hours or more. When the aging treatment is completed, a spherical polymethylsilsesquioxane particle dispersion liquid having dispersed therein a spherical polymethylsilsesquioxane particle (mixed solution after the completion of the aging treatment) can be obtained.

When the non-surface-treated particle is to be obtained, after the first step to the third step (particle formation process) have been performed, the spherical polymethylsilsesquioxane particle dispersion liquid obtained in the third step is subjected to solid-liquid separation treatment without being subjected to any surface treatment, such as the fourth step (hydrophobizing treatment). The solid (non-surface-treated particle) collected by the solid-liquid separation treatment may be utilized as it is in various applications. However, in order to obtain a non-surface-treated particle with smaller amounts of impurities, the solid is preferably subjected to drying treatment. A method of drying the solid is not particularly limited, and may be selected from known methods, such as air blast drying and drying under reduced pressure. Of those, in particular, drying under reduced pressure is more preferred because dry powder that is easy to loosen is obtained. A drying temperature is not particularly limited as long as a functional group, such as an alkyl group, contained in the non-surface-treated particle is not decomposed at the temperature, and may be appropriately set to a suitable temperature from the range of from 65° C. to 350° C., in particular, the range of from 80° C. to 250° C. In addition, a drying time is not particularly limited, but when the drying time is set to from 2 hours to 48 hours, a sufficiently dried non-surface-treated particle can be obtained.

Meanwhile, when the hydrophobized particle is to be obtained, the fourth step (hydrophobizing treatment) is further performed after the first step to the third step (particle formation process) have been performed.

In the fourth step, a hydrophobizing agent is further blended in the spherical polymethylsilsesquioxane particle dispersion liquid to subject the surface of the spherical polymethylsilsesquioxane particle (non-surface-treated particle) to hydrophobizing treatment. With this, as compared to the non-surface-treated particle, the hydrophobized particle to be obtained can have a larger degree of hydrophobicity (M value).

As a method for the hydrophobizing treatment, there is given, for example, a method involving subjecting the spherical polymethylsilsesquioxane particle (non-surface-treated particle) collected from the spherical polymethylsilsesquioxane particle dispersion liquid obtained in the third step to the hydrophobizing treatment. However, in this method, particles are liable to be aggregated together to generate an aggregate mass in the step of subjecting the non-surface-treated particles to solid-liquid separation and in the step of further drying the particles. Accordingly, the hydrophobized particle to be obtained after the hydrophobizing treatment is liable to have a wide particle size distribution width and be reduced in disintegrability.

In contrast, when the hydrophobizing treatment is performed by directly blending the hydrophobizing agent in the spherical polymethylsilsesquioxane particle dispersion liquid as described above, if the hydrophobized particles to be obtained form an aggregate mass, its disintegrability is excellent.

An organic silicon compound is generally used as the hydrophobizing agent to be used for the hydrophobizing treatment. Examples of such organic silicon compound may include, but not particularly limited to: alkylsilazane-based compounds, such as hexamethyldisilazane; alkylalkoxysilane-based compounds, such as dimethyldimethoxysilane, diethyldiethoxysilane, trimethylmethoxysilane, triethylmethoxysilane, butyltrimethoxysilane;

methyltrimethoxysilane, and chlorosilane-based compounds, such as dimethyldichlorosilane, trimethylchlorosilane, and triethylchlorosilane; a silicone oil; and a silicone varnish. One kind of those hydrophobing agents may be used alone, or two or more kinds thereof may be used as a mixture, and any of those hydrophobing agents may be diluted with, for example, an organic solvent, before use.

Of the above-mentioned hydrophobizing agents, a hydrophobizing agent capable of introducing a trialkylsilyl group into the spherical polymethylsilsesquioxane particle is preferred, and a hydrophobizing agent capable of introducing a trialkylsilyl group having alkyl groups each having 1 to 3 carbon atoms into the spherical polymethylsilsesquioxane particle is more preferred. In addition, at least one kind selected from the group consisting of alkylsilazane-based compounds and (trialkyl)alkoxysilane-based compounds is more preferably used because of good reactivity, the ease of handling, and the like, and hexamethyldisilazane is most preferably used because the fluidity of the hydrophobized particle to be obtained is further improved.

The usage amount of the hydrophobizing agent is not particularly limited. However, an excessively 1 small usage amount may cause the hydrophobizing treatment to be insufficient, and an excessively large usage amount complicates posttreatment. Accordingly, the blending amount of the hydrophobizing agent is set to preferably from 0.01 part by mass to 300 parts by mass, more preferably from 1 part by mass to 200 parts by mass with respect to 100 parts by mass (dry weight) of the non-surface-treated particle to be subjected to the hydrophobizing treatment.

A method of blending the hydrophobizing agent in the spherical polymethylsilsesquioxane particle dispersion liquid is not particularly limited. For example, when a hydrophobizing agent that is liquid at ordinary temperature and ordinary pressure is used, the hydrophobizing agent may be dropped into the spherical polymethylsilsesquioxane particle dispersion liquid, or may be showered onto the liquid surface of the spherical polymethylsilsesquioxane particle dispersion liquid. Dropping is preferred because of the convenience of operation.

A treatment temperature is not particularly limited, and may be determined in consideration of the reactivity of the hydrophobizing agent to be used. The treatment temperature may be set to, for example, from 0° C. to 100° C. In addition, a treatment time may be set to, for example, from 0.1 hour to 72 hours. However, from the viewpoint of shortening the treatment time, the treatment temperature is preferably high, and specifically, the treatment temperature is preferably set to a temperature around the boiling point of the organic solvent used in the second step.

The hydrophobized particle to be obtained by subjecting the surface of the non-surface-treated particle to the hydrophobizing treatment with the hydrophobizing agent generally floats in the upper layer portion of the spherical polymethylsilsesquioxane particle dispersion liquid after the completion of the addition of the hydrophobizing agent thereto (this liquid is hereinafter referred to as "powder floating liquid"). As a method of collecting the hydrophobized particle from the powder floating liquid, a known method may be used without any particular limitation. For example, the floating powder may be scooped up, or a filtration method may be adopted. The filtration method is preferred because of the convenience of operation. The filtration method is not particularly limited, and a known method, such as filtration under reduced pressure, centrifugal filtration, or pressure filtration, may be selected. Filter paper, a filter, a filter fabric, or the like to be used in the filtration is not particularly limited as long as such product is industrially available, and may be appropriately selected depending on an apparatus to be used. At the time of the filtration, the solid may be further washed with pure water, methanol, or the like as required.

The collected solid (hydrophobized particle) may be utilized as it is in various applications. However, in order to obtain a hydrophobized particle with smaller amounts of impurities, the solid is preferably subjected to drying treatment. A method and specific conditions for the drying treatment are not particularly limited, but a method and conditions similar to those for the drying treatment for the solid (non-surface-treated particle) collected after the completion of the third step are suitably selected.

Examples

The present invention is more specifically described below by way of Examples and Comparative Examples. However, the present invention is not limited thereto. Various physical properties of produced samples were evaluated by methods described below. Every part of the production of particles in Examples and Comparative Examples was performed in a room controlled to a room temperature of 20° C.

1. Various Evaluation Methods for Particles (1) Measurement of 10% Cumulative Diameter (D10), 50% Cumulative Diameter (D50), and 90% Cumulative Diameter (D90), and Calculation of D90/D10

A volume-based 10% cumulative diameter (D10), 50% cumulative diameter (D50), and 90% cumulative diameter (D90) were determined through measurement by a laser diffraction/scattering method. The measurement was performed by the following procedure. First, 0.1 g of dried spherical polymethylsilsesquioxane powder was loaded into a container made of glass (inner diameter: 4 cm, height: 11 cm), and then 50 g of 2-propanol was further added to provide a mixed liquid. Next, under a state in which part of a probe (inner diameter of end: 7 mm) of an ultrasonic disperser, the part ranging 4.5 cm from its end, was immersed in the mixed liquid, ultrasonic dispersion treatment was performed at an output of 20 W for 15 minutes to provide a dispersion liquid. Subsequently, the dispersion liquid was used to measure the volume-based 10% cumulative diameter (D10), 50% cumulative diameter (D50), and 90% cumulative diameter (D90), and calculate D90/D10 with a particle size distribution measurement apparatus based on the laser diffraction/scattering method (manufactured by Beckman Coulter K.K., LS13 320). D90/D10 indicates the width of a particle size distribution, and a smaller value therefor means a narrower width of the particle size distribution.

(2) $^{13}C$ DDMAS NMR Measurement

The following three kinds of peaks and the areas thereof were measured by $^{13}C$ DDMAS NMR. AVANCE II manufactured by Bruker Biospin was used as a measurement apparatus.

<i> A peak "a" derived from a carbon atom contained in (c) the alkoxyl group (the carbon atom is a carbon atom bonded to the oxygen atom (tg) contained in (c) the alkoxyl group) and an area A thereof <ii> A peak "b" derived from the carbon atom contained in (b) the methyl group and an area B thereof <iii> A peak "c" derived from the carbon atoms bonded to the silicon atom (tg) of a trialkylsilyloxy group serving as (e) the other group and an area C thereof Measurement conditions were as follows: a probe for solid measurement (diameter: 4 mm) was used; a measured nuclide was 13C; an MAS spinning rate was 7 kHz; a pulse program was hpdec; a repetition time was 10 sec; the number of scans was 6,000 or more; and a peak (176.03 ppm) of the carbonyl of glycine was used as an external standard. In addition, the area of each peak was calculated using a peak waveform separation program. In tables showing the results of NMR measurement to be described later, the total of the area A of the peak "a", the area B of the peak "b", and the area C of the peak "c" is shown as 100%.

In addition, when NMR measurement is performed under the above-mentioned measurement conditions, in the case where (c) the alkoxyl group is a methoxy group, the peak "a" is observed at around −50 ppm, in the case of (b) the methyl group, the peak "b" is observed at around −4 ppm, and in the case where (e) the other group is a trimethylsilyl group, the peak "c" is observed at around −1 ppm. Accordingly, in the results of NMR measurement to be described later, the presence of the peak "a" means that a particle subjected to the measurement contains an alkoxyl group, a smaller area of the peak "b" than 100% means the presence of carbon other than that of a methyl group derived from polymethylsilsesquioxane, and the area C of the peak "c" means the presence ratio of carbon derived from a trialkylsilyloxy group contained in the vicinity of the surface of the particle as a result of hydrophobizing treatment.

(3) Measurement of BET Specific Surface Area ($S_1$)

A BET specific surface area ($S_1$) was measured by a nitrogen adsorption BET one-point method. The measurement was performed by the following procedure. First, around 0.12 g of spherical polymethylsilsesquioxane powder was measured into a measurement cell that had been weighed. Next, the measurement cell loaded with the spherical polymethylsilsesquioxane powder was placed in a mantle heater, and then, while the inside of the mantle heater was purged with nitrogen, pretreatment of heating at 200° C. for 80 minutes was performed. After that, the measurement cell, which had been cooled to room temperature, was placed in a BET specific surface area measurement apparatus (SA-1000 manufactured by Sibata Scientific Technology Ltd.), and liquid nitrogen was used to cause the surface of the spherical polymethylsilsesquioxane powder to adsorb nitrogen gas. Then, a BET surface area $S_X$ was obtained from the adsorption amount thereof by the BET one-point method. The mass of the measurement cell loaded with the spherical polymethylsilsesquioxane powder after the measurement was measured, and the mass of the previously measured measurement cell itself was subtracted from the resultant value to calculate the mass "m" of the spherical polymethylsilsesquioxane powder excluding the mass of moisture and the like desorbed through the pretreatment. The BET surface area $S_X$ was divided by the mass "m" to determine the specific surface area $S_1$. In this calculation, the BET surface area $S_X$ was used for the calculation after its numerical value expressed in the unit $m^2$ had been rounded off to an integer, and the mass "m" was used for the calculation after its numerical value expressed in the unit "g" had been rounded off to the second decimal place. Then, a value obtained by rounding off the thus calculated numerical value to the first decimal place was defined as the BET specific surface area $S_1$.

(4) Measurement of Particle Density (φ, and Calculation of Theoretical Specific Surface Area ($S_2$)

A particle density (φ was measured with a dry automatic densimeter model AccuPyc1330 manufactured by Shimadzu Corporation. The measurement was performed by the following procedure. First, spherical polymethylsilsesquioxane powder that had been subjected to drying treatment under reduced pressure at 120° C. for 24 hours was weighed in a 10 ml sample container to the nearest 0.0001 g. Next, the sample container was set in a measurement chamber of the dry automatic densimeter, and then the particle density was measured at a measurement temperature of 25° C. while He gas was flowed into the measurement chamber. The dry automatic densimeter is configured to display the particle density to five decimal places in the unit $g/cm^3$ when the mass of the powder subjected to the measurement is input. Therefore, as the particle density ρ to be used for the calculation of a specific surface area $S_2$, there was used a numerical value obtained by further converting a numerical value, which had been obtained by rounding off the particle density expressed in $g/cm^3$ to the second decimal place, into a value expressed in $g/m^3$.

The theoretical specific surface area $S_2$ ($m^2/g$) was calculated from the following equation (5) using the measured values of D50 and ρ. In this case, a value obtained by rounding off a numerical value calculated on the basis of the right side of the following equation (5) to the first decimal place was defined as the theoretical specific surface area $S_2$.

$$S_2=6/\rho d \qquad \text{Equation (5)}$$

In the equation (5), "d" represents the value of D50 (m), and ρ represents the particle density ($g/m^3$). In the description of the present application, in general, the value of D50 is expressed in μm, and the value of ρ is expressed in $g/cm^3$. However, in the calculation of the theoretical specific surface area $S_2$, the values of D50 and ρ are converted into values expressed in m and $g/m^3$, respectively.

(5) Measurement of Degree of Hydrophobicity (M Value)

A degree of hydrophobicity (M value) was measured by a methanol titration method. The measurement was performed by the following procedure. First, a container (beaker) having a volume of 200 ml in which 50 ml of pure water and 0.2 g of spherical polymethylsilsesquioxane powder were placed was prepared. Next, until the whole amount of the spherical polymethylsilsesquioxane powder was brought into a state of being wetted and dispersed in the liquid, methanol was dropped from a burette into the container while the contents of the container were stirred. The value of the volume percentage of the amount of dropped methanol with respect to the total amount of pure water (50 ml) and dropped methanol at the time of the completion of the dropping is the degree of hydrophobicity (M value). A higher degree of hydrophobicity (M value) indicates higher hydrophobicity, and a lower value thereof indicates higher hydrophilicity.

(6) $^{29}Si$ DDMAS NMR Measurement

An area D of a peak "d" derived from a silicon atom (n) indicated by symbol D in the structural formula (1), and an area E of a peak "e" derived from a silicon atom (n) indicated by symbol E in the structural formula (2) were measured by $^{29}Si$ DDMAS NMR. AVANCE II manufactured by Bruker Biospin was used as a measurement apparatus. The measurement was performed under the following measurement conditions: a probe for solid measurement (diameter: 4 mm) was used; a measured nuclide was 29Si; an MAS spinning rate was 8 kHz; a pulse program was hpdec; a repetition time was 20 sec; the number of scans was 4,000 or more; and a peak (34 ppm) of polydimethylsilane was used as an external standard. In addition, the area of each peak was calculated using a peak waveform separation program. In tables showing the results of NMR measurement to be described later, a relative ratio (%) of the peak area D with respect to 100% (reference value) of the peak area E is shown. A peak to be observed at around −56 ppm corresponds to the peak "d", and a peak to be observed at around −65 ppm corresponds to the peak "e".

(7) Measurement of Carbon Amount

The total amount of carbon atoms (carbon amount) contained in spherical polymethylsilsesquioxane was measured with SUMIGRAPH NC-22F manufactured by Sumika Chemical Analysis Service, Ltd. Specifically, 30 mg of spherical polymethylsilsesquioxane powder was weighed and burned at a reaction furnace temperature of 900° C., and the carbon amount was measured at a reducing furnace temperature of 600° C.

(8) Measurement of Adhesion Amount (Adhesive Amount) of Particles to Solid Surface The measurement of the adhesion amount (adhesive amount) of particles to a solid surface was performed by the following procedure. First, 1 g of dried spherical polymethylsilsesquioxane powder was loaded into a container made of glass (inner diameter: 4 cm, height: 11 cm), and then 50 g of 2-propanol was further added to provide a mixed liquid. Next, under a state in which part of a probe (inner diameter of end: 7 mm) of an ultrasonic disperser, the part ranging 4.5 cm from its end, was immersed in the mixed liquid, ultrasonic dispersion treatment was performed at an output of 20 W for 15 minutes to provide a dispersion liquid. 4 cc of the dispersion liquid was uniformly dropped to one surface of a slide glass having a mass W1 (g) (Matsunami Glass Ind., Ltd., product number: S1111, product name: Shirofuchimigaki No. 1, width: 26 mm, length: 76 mm), and then the slide glass was vacuum-dried at 120° C. for 3 hours. The slide glass after the vacuum-drying treatment was tapped 10 times at a stroke length of 18 mm and a tapping rate of 60 taps/min through use of Powder Tester PT-X manufactured by Hosokawa Micron Corporation. Then, a weight W2 (g) of the slide glass after the tapping was measured. Herein, the adhesive amount to glass was calculated on the basis of the following equation (6).

$$\text{Adhesive amount to glass } (g/m^2)=(W2-W1)/0.001976 \qquad \text{Equation (6)}$$

2. Production of Particles

Example A1

First Step

A 1,000 ml recovery flask was loaded with 56 g of water and 0.01 g of acetic acid serving as a catalyst, and the mixture was stirred at 30° C. 70 g of methyltrimethoxysilane was added thereto, and the mixture was stirred for 1 hour to provide 126 g of a raw material solution. In this case, the amount of methanol generated by the hydrolysis reaction of methyltrimethoxysilane is 49.5 g. The alcohol amount is a theoretically calculated value on the assumption of 100% hydrolysis, and the same applies to each of the following Examples and Comparative Examples.

Second Step

A 1,000 ml recovery flask was loaded with 2.9 g of 25% ammonia water, 91.2 g of water, and 313.8 g of methanol, and the mixture was stirred at 30° C. to prepare an alkaline aqueous medium. To the alkaline aqueous medium, 126.0 g of the raw material solution obtained in the first step was dropped over 1 minute. The mixed liquid after the dropping of the raw material solution was directly stirred for 25 minutes to allow the polycondensation reaction of the particle precursor to proceed, to thereby provide 533.9 g of a polycondensation reaction liquid (liquid temperature: 30° C.).

Third Step

The third step was performed using the reaction apparatus 10 illustrated in FIG. 5. The Y-shaped trifurcate tubular reactor 20 used has an angle formed between the central axis of the first flow passage 110 and the central axis of the second flow passage 120 (hereinafter sometimes referred to as "branching angle") of 90 degrees, and has a ratio R/d1 (and R/d2) between the distance R from the flow outlet side of the constricted portion 112 (and the constricted portion 114) to the central point C and the constricted portion diameter d1 (and d2) of 12.5.

In this example, 533.9 g of the polycondensation reaction liquid and 533.9 g of a 10 mass % methanol aqueous solution (liquid temperature: 25° C.) serving as an aqueous solution were simultaneously supplied in such a manner that the former was supplied from the inlet side of the first flow passage 110 at a flow rate in the vicinity of the connecting portion 140 of 1.9 m/sec and the latter was supplied from the inlet side of the second flow passage 120 at a flow rate in the vicinity of the connecting portion 140 of 1.9 m/sec (flow rate of aqueous solution/flow rate of polycondensation reaction liquid=1, hereinafter referred to as "flow rate ratio"), to thereby perform collisional mixing in the connecting portion 140. Then, 1,067.8 g of a mixed solution discharged from the third flow passage 130, that is, a dispersion liquid containing spherical polymethylsilsesquioxane particles was obtained. The dispersion liquid (mixed solution) contained 3.2 mass % of the spherical polymethylsilsesquioxane particles, and the content of organic solvents in the dispersion liquid (mixed solution) was 39 mass %.

The dispersion liquid was left at rest at 20° C. for 24 hours (aging treatment), and then powder of spherical polymethylsilsesquioxane particles was collected by suction filtration and dried under reduced pressure at 120° C. for 24 hours to provide 34 g of white dry powder of spherical polymethylsilsesquioxane particles.

Example A2

Spherical polymethylsilsesquioxane particles were produced in the same manner as in Example A1 except that the aqueous solution to be used in the third step was changed to a 20 mass % methanol aqueous solution. The content of organic solvents in the dispersion liquid obtained in the third step was 44 mass %.

Example A3

Spherical polymethylsilsesquioxane particles were produced in the same manner as in Example A1 except that the aqueous solution to be used in the third step was changed to a 25 mass % methanol aqueous solution. The content of organic solvents in the dispersion liquid obtained in the third step was 47 mass %.

Example A4

Spherical polymethylsilsesquioxane particles were produced in the same manner as in Example A1 except that the aqueous solution to be used in the third step was changed to a 30 mass % methanol aqueous solution. The content of organic solvents in the dispersion liquid obtained in the third step was 49 mass %.

Example A5

Spherical polymethylsilsesquioxane particles were produced in the same manner as in Example A1 except that the aqueous solution to be used in the third step was changed to a 35 mass % methanol aqueous solution. The content of organic solvents in the dispersion liquid obtained in the third step was 52 mass %.

Example A6

Spherical polymethylsilsesquioxane particles were produced in the same manner as in Example A1 except that the aqueous solution to be used in the third step was changed to a 40 mass % methanol aqueous solution. The content of organic solvents in the dispersion liquid obtained in the third step was 54 mass %.

Example A7

Spherical polymethylsilsesquioxane particles were produced in the same manner as in Example A1 except that the aqueous solution to be used in the third step was changed to a 45 mass % methanol aqueous solution. The content of organic solvents in the dispersion liquid obtained in the third step was 57 mass %.

Example A8

Spherical polymethylsilsesquioxane particles were produced in the same manner as in Example A1 except that the aqueous solution to be used in the third step was changed to a 20 mass % ethanol aqueous solution. The content of organic solvents in the dispersion liquid obtained in the third step was 44 mass %.

Example A9

Spherical polymethylsilsesquioxane particles were produced in the same manner as in Example A1 except that: the aqueous solution to be used in the third step was changed to a 30 mass % ethanol aqueous solution; and the period of time for which the dispersion liquid obtained in the third step was left at rest (aging time) was changed to 144 hours. The content of organic solvents in the dispersion liquid obtained in the third step was 49 mass %.

Example A10

Spherical polymethylsilsesquioxane particles were produced in the same manner as in Example A1 except that the aqueous solution to be used in the third step was changed to a 20 mass % isopropyl alcohol aqueous solution. The content of organic solvents in the dispersion liquid obtained in the third step was 44 mass %.

Example A11

Spherical polymethylsilsesquioxane particles were produced in the same manner as in Example A1 except that: the aqueous solution to be used in the third step was changed to a 25 mass % isopropyl alcohol aqueous solution; and the period of time for which the dispersion liquid obtained in the third step was left at rest (aging time) was changed to 144 hours. The content of organic solvents in the dispersion liquid obtained in the third step was 47 mass %.

Example A12

Spherical polymethylsilsesquioxane particles were produced in the same manner as in Example A1 except that the aqueous solution to be used in the third step was changed to a 15 mass % acetone aqueous solution. The content of organic solvents in the dispersion liquid obtained in the third step was 42 mass %.

Example A13

Spherical polymethylsilsesquioxane particles were produced in the same manner as in Example A1 except that: the aqueous solution to be used in the third step was changed to a 25 mass % acetone aqueous solution; and the period of time for which the dispersion liquid obtained in the third step was left at rest (aging time) was changed to 144 hours. The content of organic solvents in the dispersion liquid obtained in the third step was 47 mass %.

Example A14

Spherical polymethylsilsesquioxane particles were produced in the same manner as in Example A1 except that the aqueous solution to be used in the third step was changed to a 15 mass % tetrahydrofuran aqueous solution. The content of organic solvents in the dispersion liquid obtained in the third step was 42 mass %.

Example A15

First Step

A 1,000 ml recovery flask was loaded with 62 g of water and 0.55 g of acetic acid serving as a catalyst, and the mixture was stirred at 40° C. 98.3 g of methyltriethoxysilane was added thereto, and the mixture was stirred for 90 minutes to provide 160.9 g of a raw material solution. In this case, the amount of ethanol generated by the hydrolysis reaction of methyltriethoxysilane is 76 g.

Second Step

A 1,000 ml recovery flask was loaded with 4.3 g of 25% ammonia water, 91.2 g of water, and 313.8 g of ethanol, and the mixture was stirred at 30° C. to prepare an alkaline aqueous medium. To the alkaline aqueous medium, 160.9 g of the raw material solution obtained in the first step was dropped over 1 minute. The mixed liquid after the dropping of the raw material solution was directly stirred for 25 minutes to allow the polycondensation reaction of the particle precursor to proceed, to thereby provide 570.2 g of a polycondensation reaction liquid (liquid temperature: 30° C.).

Third Step

The third step was performed using the reaction apparatus 10 illustrated in FIG. 5. The Y-shaped trifurcate tubular reactor 20 used has an angle formed between the central axis of the first flow passage 110 and the central axis of the second flow passage 120 (hereinafter sometimes referred to as "branching angle") of 90 degrees, and has a ratio R/d1 (and R/d2) between the distance R from the flow outlet side of the constricted portion 112 (and the constricted portion 114) to the central point C and the constricted portion diameter d1 (and d2) of 12.5.

In this example, 570.2 g of the polycondensation reaction liquid and 570.2 g of a 20 mass % ethanol aqueous solution (liquid temperature: 25° C.) serving as an aqueous solution were simultaneously supplied in such a manner that the former was supplied from the inlet side of the first flow passage 110 at a flow rate in the vicinity of the connecting portion 140 of 1.9 m/sec and the latter was supplied from the inlet side of the second flow passage 120 at a flow rate in the vicinity of the connecting portion 140 of 1.9 m/sec (flow rate of aqueous solution/flow rate of polycondensation reaction liquid=1, hereinafter referred to as "flow rate ratio"), to thereby perform collisional mixing in the connecting portion 140. Then, 1,140.4 g of a mixed solution discharged from the third flow passage 130, that is, a dispersion liquid containing spherical polymethylsilsesquioxane particles was obtained. The dispersion liquid (mixed solution) contained 3.3 mass % of the spherical polymethylsilsesquioxane particles, and the content of organic solvents in the dispersion liquid (mixed solution) was 44 mass %.

The dispersion liquid was left at rest at 20° C. for 72 hours (aging treatment), and then, in the same manner as in Example A1, powder of spherical polymethylsilsesquioxane particles was collected by suction filtration and dried under reduced pressure at 120° C. for 24 hours to provide white dry powder of spherical polymethylsilsesquioxane particles.

Comparative Example A1

Spherical polymethylsilsesquioxane particles were produced in the same manner as in Example A1 except that the aqueous solution to be used in the third step was changed to a 50 mass % methanol aqueous solution. The content of organic solvents in the dispersion liquid obtained in the third step was 59 mass %. The dispersion liquid was aged by being left at rest at 20° C. for 24 hours, and then an attempt was made to collect powder of spherical polymethylsilsesquioxane particles by suction filtration. However, the collected solid was a gel-like mass. In addition, the gel-like mass was observed by FE-SEM, but no particle component was found.

Comparative Example A2

The first step, the second step, and the third step were sequentially performed in the same manner as in Example 2-7 of WO 2015/107961 A1. In this particle formation process, the liquid temperature of the polycondensation reaction liquid was set to 30° C., and the liquid temperature of the aqueous solution was set to 25° C. In addition, the aqueous solution to be used in the third step was formed only of water (organic solvent concentration: 0 mass %), and the content of organic solvents in the dispersion liquid obtained through the third step was 49 mass %.

For the obtained dispersion liquid, aging treatment, collection by suction filtration, and drying under reduced pressure were performed in the same manner as in Example A1 to provide white dry powder of spherical polymethylsilsesquioxane particles.

For reference, substantial differences in production process between Example 2-7 of WO 2015/107961 A1 and Comparative Example A2 are whether or not the fourth step (hydrophobizing treatment) is performed, and whether or not the aging treatment at 20° C. for 24 hours is performed. In addition, Example 2-7 of WO 2015/107961 A1 is an experimental example in which the content of organic solvents in the dispersion liquid obtained through the third step is the largest among all Examples disclosed in WO 2015/107961 A1.

Comparative Example A3

The first step, the second step, and the third step were sequentially performed in the same manner as in Example 2-25 of WO 2015/107961 A1. In this particle formation process, the liquid temperature of the polycondensation reaction liquid was set to 30° C., and the liquid temperature of the aqueous solution was set to 25° C. In addition, the aqueous solution to be used in the third step was formed only of water (organic solvent concentration: 0 mass %), and the content of organic solvents in the dispersion liquid obtained through the third step was 48 mass %.

For the obtained dispersion liquid, aging treatment, collection by suction filtration, and drying under reduced pressure were performed in the same manner as in Example A1 to provide white dry powder of spherical polymethylsilsesquioxane particles.

For reference, substantial differences in production process between Example 2-25 of WO 2015/107961 A1 and Comparative Example A3 are whether or not the fourth step (hydrophobizing treatment) is performed, and whether or not the aging treatment at 20° C. for 24 hours is performed. In addition, Example 2-25 of WO 2015/107961 A1 is an experimental example in which the content of organic solvents in the dispersion liquid obtained through the third step is the second largest among all Examples disclosed in WO 2015/107961 A1.

Comparative Example A4

Spherical polymethylsilsesquioxane particles were produced in the same manner as in Example A1 except that water containing no organic solvent was used as the aqueous solution to be used in the third step. The content of organic solvents in the dispersion liquid obtained in the third step was 34 mass %.

Comparative Example A5

Spherical polymethylsilsesquioxane particles were produced in the same manner as in Example A1 except that, in the third step, the collisional mixing conditions in the connecting portion 140 of the furcate tubular reactor 20 were changed to the following conditions.

<Collisional Mixing Conditions>

(1) Supply Amount and Flow Rate of Polycondensation Reaction Liquid to be Supplied from Inlet Side of First Flow Passage 110:

The supply amount and the flow rate were set to be equal to those in Example A1.

(2) Supply Amount and Flow Rate of 10 Mass % Methanol Aqueous Solution to be Supplied from Inlet Side of Second Flow Passage 120:

The supply amount was changed to 1,016 g (liquid temperature: 25° C.), and the flow rate was changed to 3.6 m/sec.

(3) Flow Rate Ratio

The flow rate ratio was changed to 1.9.

1,550 g of a dispersion liquid containing spherical polymethylsilsesquioxane particles was obtained by performing the third step. In addition, the dispersion liquid (mixed solution) contained 2.2 of mass % the spherical polymethylsilsesquioxane particles, and the content of organic solvents in the dispersion liquid (mixed solution) was 30 mass %.

Comparative Example A6

Spherical polymethylsilsesquioxane particles were produced in the same manner as in Example A1 except that the aging time of the dispersion liquid (mixed solution) obtained through the third step was changed to 0.5 hour.

Comparative Example A7

Spherical polymethylsilsesquioxane particles were produced in the same manner as in Example A2 except that the aging time of the dispersion liquid (mixed solution) obtained through the third step was changed to 0.5 hour. However, even when the dispersion liquid after the aging treatment was subjected to suction filtration, substantially no solid was able to be collected. Thus, it was found that sufficient particle formation had not been achieved.

Comparative Example A8

A 200 ml recovery flask was loaded with 54.0 g of water and 0.01 g of acetic acid serving as a catalyst, and the mixture was stirred at 30° C. 68.0 g of methyltrimethoxysilane was added thereto, and the mixture was stirred for 4 hours to provide 122.0 g of a reaction solution. In this case, the amount of methanol generated by the hydrolysis reaction of methyltrimethoxysilane is 48.1 g.

122.0 g of the reaction solution was added to a mixed liquid at 25° C. formed of 14 g of 25% ammonia water and 498 g of water, and immediately upon the addition, the solution became cloudy. The content of the organic solvent in this mixed liquid was 7.6 mass %. The mixed liquid that had become cloudy was stirred at 30° C. for 16 hours and then left at rest for 5 minutes. As a result, a white precipitate was generated at the bottom of the flask. The precipitate was collected by suction filtration, and the resultant cake was dried under reduced pressure at 120° C. for 24 hours to provide powder of spherical polymethylsilsesquioxane particles.

Comparative Example A9

Powder of spherical polymethylsilsesquioxane particles was obtained in the same manner as in Comparative Example A8 except that the amount of 25% ammonia water and the amount of water were changed to 2.8 g and 511 g, respectively. The content of the organic solvent in the mixed liquid was 7.6 mass %.

Example B1

First Step

A 1,000 ml recovery flask was loaded with 56 g of water and 0.01 g of acetic acid serving as a catalyst, and the mixture was stirred at 30° C. 70 g of methyltrimethoxysilane was added thereto, and the mixture was stirred for 1 hour to provide 126 g of a raw material solution. In this case, the amount of methanol generated by the hydrolysis reaction of methyltrimethoxysilane is 49.5 g. The alcohol amount is a theoretically calculated value on the assumption of 100% hydrolysis, and the same applies to each of the following Examples and Comparative Examples.

Second Step

A 1,000 ml recovery flask was loaded with 2.9 g of 25% ammonia water, 91.2 g of water, and 313.8 g of methanol, and the mixture was stirred at 30° C. to prepare an alkaline aqueous medium. To the alkaline aqueous medium, 126.0 g of the raw material solution obtained in the first step was dropped over 1 minute. The mixed liquid after the dropping of the raw material solution was directly stirred for 25 minutes to allow the polycondensation reaction of the particle precursor to proceed, to thereby provide 533.9 g of a polycondensation reaction liquid (liquid temperature: 30° C.).

Third Step

The third step was performed using the reaction apparatus 10 illustrated in FIG. 5. The Y-shaped trifurcate tubular reactor 20 used has an angle formed between the central axis of the first flow passage 110 and the central axis of the second flow passage 120 (hereinafter sometimes referred to as "branching angle") of 90 degrees, and has a ratio R/d1 (and R/d2) between the distance R from the flow outlet side of the constricted portion 112 (and the constricted portion 114) to the central point C and the constricted portion diameter d1 (and d2) of 12.5.

In this example, 533.9 g of the polycondensation reaction liquid and 533.9 g of a 10 mass % methanol aqueous solution (liquid temperature: 25° C.) serving as an aqueous solution were simultaneously supplied in such a manner that the former was supplied from the inlet side of the first flow passage 110 at a flow rate in the vicinity of the connecting portion 140 of 1.9 m/sec and the latter was supplied from the inlet side of the second flow passage 120 at a flow rate in the vicinity of the connecting portion 140 of 1.9 m/sec (flow rate of aqueous solution/flow rate of polycondensation reaction liquid=1, hereinafter referred to as "flow rate ratio"), to thereby perform collisional mixing in the connecting portion 140. Then, 1,067.8 g of a mixed solution discharged from the third flow passage 130, that is, a dispersion liquid containing spherical polymethylsilsesquioxane particles was obtained. The dispersion liquid (mixed solution) contained 3.2 mass % of fine particles, and the content of organic solvents therein was 39 mass %.

The dispersion liquid was left at rest at 20° C. for 24 hours (aging treatment).

Fourth Step

The dispersion liquid after the aging treatment was increased in temperature to 65° C., and then 17.2 g of hexamethyldisilazane was added as a hydrophobizing agent, followed by stirring for 3 hours. Powder of hydrophobized spherical polymethylsilsesquioxane particles that had floated up to the upper layer portion of the liquid was collected by suction filtration and dried under reduced pressure at 120° C. for 24 hours to provide 34 g of white dry powder of hydrophobized spherical polymethylsilsesquioxane particles.

Example B2

A spherical polymethylsilsesquioxane particle dispersion liquid was obtained in the same manner as in Example B1 except that: the aqueous solution to be used in the third step was changed to a 20 mass % methanol aqueous solution; and the period of time for which the dispersion liquid obtained in the third step was left at rest (aging time) was changed to 15 hours. The content of organic solvents in the dispersion liquid obtained in the third step was 44 mass %. Subsequently, the dispersion liquid after the aging treatment was increased in temperature to 65° C., and then 8.6 g of hexamethyldisilazane was added as a hydrophobizing agent, followed by stirring for 3 hours. After that, suction filtration and drying under reduced pressure were performed in the same manner as in Example B1 to provide dry powder of spherical polymethylsilsesquioxane particles.

Example B3

A spherical polymethylsilsesquioxane particle dispersion liquid was obtained in the same manner as in Example B1 except that the aqueous solution to be used in the third step was changed to a 25 mass % methanol aqueous solution. The content of organic solvents in the dispersion liquid obtained in the third step was 47 mass %. Subsequently, the dispersion liquid was subjected to aging treatment in the same manner as in Example B1, and was then increased in temperature to 65° C., and then 17.2 g of hexamethyldisilazane was added as a hydrophobizing agent, followed by stirring for 3 hours. After that, suction filtration and drying under reduced pressure were performed in the same manner as in Example B1 to provide dry powder of spherical polymethylsilsesquioxane particles.

Example B4

A spherical polymethylsilsesquioxane particle dispersion liquid was obtained in the same manner as in Example B1 except that the aqueous solution to be used in the third step was changed to a 30 mass % methanol aqueous solution. The content of organic solvents in the dispersion liquid obtained in the third step was 49 mass %. The dispersion liquid was aged by being left at rest at 20° C. for 24 hours, and then hydrophobizing treatment, suction filtration, and drying under reduced pressure were performed in the same manner as in Example B2 to provide dry powder of spherical polymethylsilsesquioxane particles.

Example B5

Dry powder of spherical polymethylsilsesquioxane particles was obtained in the same manner as in Example B4 except that the addition amount of hexamethyldisilazane at the time of the hydrophobizing treatment was changed to 3.4 g.

Example B6

A spherical polymethylsilsesquioxane particle dispersion liquid produced in the same manner as in Example B4 was subjected to aging treatment by being left at rest at 20° C. for 168 hours. Subsequently, the dispersion liquid after the aging treatment was used and subjected to hydrophobizing treatment in the same manner as in Example B2 to provide dry powder of spherical polymethylsilsesquioxane particles.

Example B7

Dry powder of spherical polymethylsilsesquioxane particles was obtained in the same manner as in Example B6 except that the addition amount of hexamethyldisilazane at the time of the hydrophobizing treatment was changed to 3.4 g.

Example B8

A spherical polymethylsilsesquioxane particle dispersion liquid was obtained in the same manner as in Example B1 except that the aqueous solution to be used in the third step was changed to a 35 mass % methanol aqueous solution. The content of organic solvents in the dispersion liquid obtained in the third step was 52 mass %. The dispersion liquid was aged by being left at rest at 20° C. for 24 hours, and then hydrophobizing treatment, suction filtration, and drying under reduced pressure were performed in the same manner as in Example B1 to provide dry powder of spherical polymethylsilsesquioxane particles.

Example B9

A spherical polymethylsilsesquioxane particle dispersion liquid was obtained in the same manner as in Example B1 except that the aqueous solution to be used in the third step was changed to a 40 mass % methanol aqueous solution. The content of organic solvents in the dispersion liquid obtained in the third step was 54 mass %. The dispersion liquid was subjected to aging treatment by being left at rest at 20° C. for 24 hours, and then hydrophobizing treatment, suction filtration, and drying under reduced pressure were performed in the same manner as in Example B2 to provide dry powder of spherical polymethylsilsesquioxane particles.

Example B10

A spherical polymethylsilsesquioxane particle dispersion liquid produced in the same manner as in Example B9 was subjected to aging treatment by being left at rest at 20° C. for 168 hours. Subsequently, the dispersion liquid after the aging treatment was used and subjected to hydrophobizing treatment, suction filtration, and drying under reduced pressure in the same manner as in Example B2 to provide dry powder of spherical polymethylsilsesquioxane particles.

Example B11

A spherical polymethylsilsesquioxane particle dispersion liquid was obtained in the same manner as in Example B1 except that the aqueous solution to be used in the third step was changed to a 45 mass % methanol aqueous solution. The content of organic solvents in the dispersion liquid obtained in the third step was 57 mass %. The dispersion liquid was subjected to aging treatment by being left at rest at 20° C. for 24 hours, and then hydrophobizing treatment, suction filtration, and drying under reduced pressure were performed in the same manner as in Example B1 to provide dry powder of spherical polymethylsilsesquioxane particles.

Example B12

A spherical polymethylsilsesquioxane particle dispersion liquid was obtained in the same manner as in Example B1 except that the aqueous solution to be used in the third step was changed to a 30 mass % ethanol aqueous solution. The content of organic solvents in the dispersion liquid obtained in the third step was 49 mass %. The dispersion liquid was subjected to aging treatment by being left at rest at 20° C. for 144 hours, and then hydrophobizing treatment, suction filtration, and drying under reduced pressure were performed in the same manner as in Example B1 to provide dry powder of spherical polymethylsilsesquioxane particles.

Example B13

A spherical polymethylsilsesquioxane particle dispersion liquid was obtained in the same manner as in Example B1 except that the aqueous solution to be used in the third step was changed to a 20 mass % isopropyl alcohol aqueous solution. The content of organic solvents in the dispersion liquid obtained in the third step was 44 mass %. The dispersion liquid was subjected to aging treatment by being left at rest at 20° C. for 24 hours, and then hydrophobizing treatment, suction filtration, and drying under reduced pressure were performed in the same manner as in Example B1 to provide dry powder of spherical polymethylsilsesquioxane particles.

Example B14

A spherical polymethylsilsesquioxane particle dispersion liquid was obtained in the same manner as in Example B1 except that the aqueous solution to be used in the third step was changed to a 25 mass % isopropyl alcohol aqueous solution. The content of organic solvents in the dispersion liquid obtained in the third step was 47 mass %. The dispersion liquid was subjected to aging treatment by being left at rest at 20° C. for 144 hours, and then hydrophobizing treatment, filtration, and drying under reduced pressure were performed in the same manner as in Example B1 to provide dry powder of spherical polymethylsilsesquioxane particles.

Example B15

A spherical polymethylsilsesquioxane particle dispersion liquid was obtained in the same manner as in Example B1 except that the aqueous solution to be used in the third step was changed to a 25 mass % acetone aqueous solution. The content of organic solvents in the dispersion liquid obtained in the third step was 47 mass %. The dispersion liquid was subjected to aging treatment by being left at rest at 20° C. for 144 hours, and then hydrophobizing treatment, suction filtration, and drying under reduced pressure were performed in the same manner as in Example B1 to provide dry powder of spherical polymethylsilsesquioxane particles.

Example B16

Operations identical to those of Example A15 were performed up to the third step to provide 1, 140.4 g of a dispersion liquid containing spherical polymethylsilsesquioxane particles. The content of organic solvents in the dispersion liquid obtained in the third step was 44 mass % as in Example A15. The dispersion liquid was left at rest at 20° C. for 72 hours (aging treatment). After that, the dispersion liquid was increased in temperature to 65° C., and then 17.2 g of hexamethyldisilazane was added as a hydrophobizing agent, followed by stirring for 3 hours. Powder of hydrophobized spherical polymethylsilsesquioxane particles that had floated up to the upper layer portion of the liquid was collected by suction filtration and dried under reduced pressure at 120° C. for 24 hours to provide 38 g of white dry powder of hydrophobized spherical polymethylsilsesquioxane particles.

Comparative Example B1

As a reproduction experiment of Example 2-7 of WO 2015/107961 A1, the first step, the second step, the third step, and the fourth step were sequentially performed. In this particle formation process, the liquid temperature of the polycondensation reaction liquid was set to 30° C., and the liquid temperature of the aqueous solution was set to 25° C. In addition, the aqueous solution to be used in the third step was formed only of water (organic solvent concentration: 0 mass %), and the content of organic solvents in the dispersion liquid obtained through the third step was 49 mass %.

For the dispersion liquid obtained by performing the fourth step, collection by suction filtration and drying under reduced pressure were performed in the same manner as in Example A1 to provide white dry powder of spherical polymethylsilsesquioxane particles.

Although aging treatment was not actively performed, a working time of about 30 minutes was taken after the completion of the third step until the fourth step was performed (hexamethyldisilazane was added). Therefore, the aging time is regarded as 0.5 hour.

Comparative Example B2

White dry powder of spherical polymethylsilsesquioxane particles was obtained by performing the same operations as in Comparative Example B1 except that, after the completion of the third step, aging treatment was performed at 20° C. for 12 hours before the fourth step was performed.

Comparative Example B3

As a reproduction experiment of Example 2-25 of WO 2015/107961 A1, the first step, the second step, the third step, and the fourth step were sequentially performed. In this particle formation process, the liquid temperature of the polycondensation reaction liquid was set to 30° C., and the liquid temperature of the aqueous solution was set to 25° C. In addition, the aqueous solution to be used in the third step was formed only of water (organic solvent concentration: 0 mass %), and the content of organic solvents in the dispersion liquid obtained through the third step was 48 mass %.

For the dispersion liquid obtained by performing the fourth step, collection by suction filtration and drying under reduced pressure were performed in the same manner as in Example A1 to provide white dry powder of spherical polymethylsilsesquioxane particles.

Although aging treatment was not actively performed, a working time of about 30 minutes was taken after the completion of the third step until the fourth step was performed (hexamethyldisilazane was added). Therefore, the aging time is regarded as 0.5 hour.

Comparative Example B4

White dry powder of spherical polymethylsilsesquioxane particles was obtained by performing the same operations as in Comparative Example B3 except that, after the completion of the third step, aging was performed at 20° C. for 12 hours before the fourth step was performed.

Comparative Example B5

Operations identical to those of Comparative Example A4 were performed up to the completion of the third step to provide a dispersion liquid (mixed solution) containing spherical polymethylsilsesquioxane particles.

The obtained dispersion liquid was left at rest at 20° C. for 24 hours (aging treatment) in the same manner as in Example B1. Then, the dispersion liquid after the aging treatment was increased in temperature to 65° C., and then 8.6 g of hexamethyldisilazane was added as a hydrophobizing agent, followed by stirring for 3 hours. Thus, the fourth step (hydrophobizing treatment) was performed. After the hydrophobizing treatment, collection by suction filtration and drying under reduced pressure were performed in the same manner as in Example B1 to provide white dry powder of spherical polymethylsilsesquioxane particles.

Comparative Example B6

A 200 ml recovery flask was loaded with 54.0 g of water and 0.01 g of acetic acid serving as a catalyst, and the mixture was stirred at 30° C. 68.0 g of methyltrimethoxysilane was added thereto, and the mixture was stirred for 4 hours to provide 122.0 g of a reaction solution. In this case, the amount of methanol generated by the hydrolysis reaction of methyltrimethoxysilane is 48.1 g.

122.0 g of the reaction solution was added to a mixed liquid at 25° C. formed of 14 g of 25% ammonia water and 498 g of water, and immediately upon the addition, the solution became cloudy. The content of the organic solvent in this mixed liquid was 7.6 mass %. The mixed liquid that had become cloudy was stirred at 30° C. for 16 hours, and then 15.2 g of hexamethyldisilazane was added, followed by stirring for 48 hours. A precipitate generated in the mixed liquid to which hexamethyldisilazane had been added and which had been stirred was collected by suction filtration, and the thus obtained cake was dried under reduced pressure at 120° C. for 24 hours to provide powder of spherical polymethylsilsesquioxane particles.

3. Experimental Results

Table 1 to Table 9 show main production conditions and various evaluation results of the particles in each of Examples and Comparative Examples. In the tables, the meanings of terms denoted with *1 to *7 are as described below.

*1: The aqueous solution to be mixed with the polycondensation reaction liquid in the third step.

*2: The mixed solution (dispersion liquid) obtained by mixing the polycondensation reaction liquid with the aqueous solution in the third step.

*3: Whether or not surface treatment (hydrophobizing treatment) with hexamethyldisilazane was performed

*4: A relative ratio of a peak area obtained by $^{13}C$ DDMAS NMR measurement (value with respect to 100% (reference value) of the total value of the areas A, B, and C)

*5: A relative ratio of a peak area obtained by $^{29}Si$ DDMAS NMR measurement (value with respect to 100% (reference value) of the area E).

*6: A ratio representing [{(c) alkoxyl group+(d) hydroxy group}/(b) methyl group]

*7: A ratio representing [(c) alkoxyl group/{(c) alkoxyl group+(d) hydroxy group}]

Figure 7:
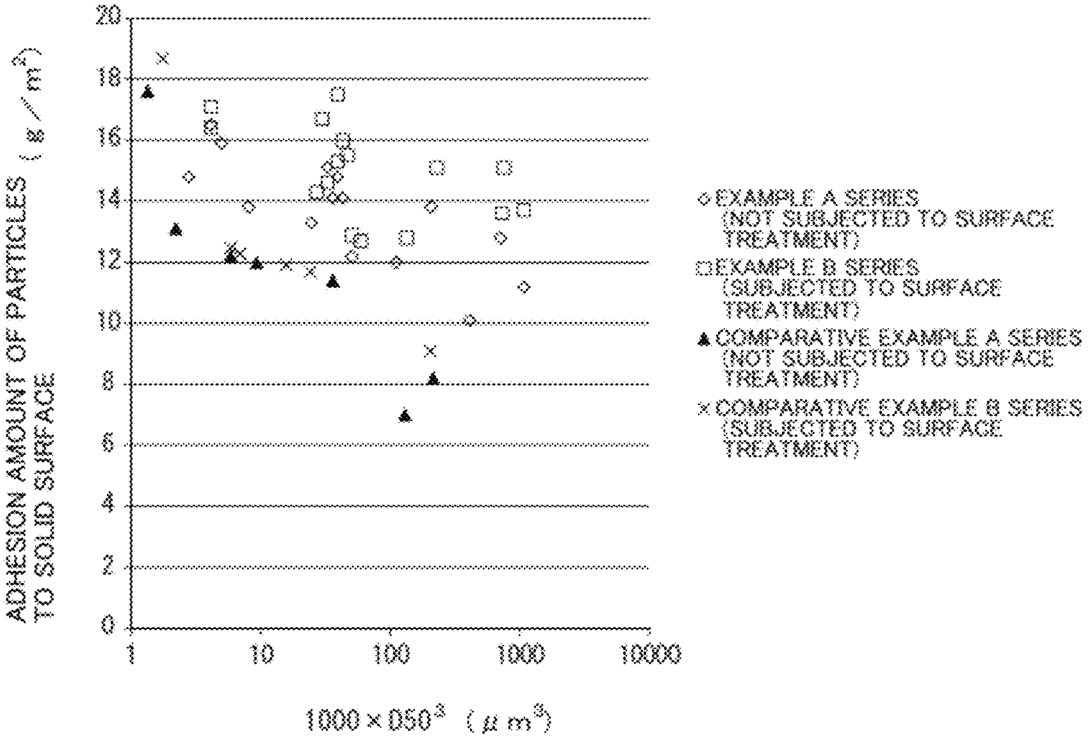
FIG. 7 is a graph obtained by plotting the adhesion amount of particles of each of Examples and Comparative Examples to a solid surface against a value obtained by multiplying the cube of their particle diameter (D50) by 1,000.

In addition, FIG. 7 shows a graph obtained by plotting the adhesion amount of the particles of each of Examples and Comparative Examples to a solid surface against a value obtained by multiplying the cube of their particle diameter (D50) by 1,000. In this connection, it is conceived that the cube of the particle diameter is a parameter substantially proportional to a force causing the particles to be desorbed from the solid surface (desorption force) (for the reason therefor, see the "Note" section below if necessary). Therefore, when it is assumed that the adhesive force of the particle with respect to the solid surface is constant, as the value on the horizontal axis in FIG. 7 (1,000×$D50^3$) increases, the adhesion amount of the particles to the solid surface inevitably decreases. In addition, when a particle A and a particle B identical to each other in value of 1,000×$D50^3$ are significantly different from each other in adhesion amount of the particle to the solid surface, it is conceived that the difference in adhesion amount means a difference in adhesive force with respect to the solid surface between the particle A and the particle B.

Meanwhile, it was found from FIG. 7 that the particles of Examples each having an $S_1/S_2$ of 8.0 or more generally had large adhesion amounts of the particles to the solid surface as compared to the particles of Comparative Examples each having an $S_1/S_2$ of less than 8.0. In addition, from a comparison between the Example A series and the Example B series, it was found that, even among the particles each having an $S_1/S_2$ of 8.0 or more, particles subjected to surface treatment (hydrophobizing treatment) generally had larger adhesion amounts of the particles to the solid surface.

<Note>

As apparent from Tables 2, 5, and 8, the density of the particles of each of Examples and Comparative Examples may be regarded as approximately constant. In addition, the volume of a substantially spherical particle is a value proportional to the cube of its particle diameter, and the mass "m" of the particle is the product of the volume and density of the particle. Accordingly, the cube of the particle diameter, which is a parameter shown in the horizontal axis in FIG. 7, is a value proportional to the mass "m" of the particle. Meanwhile, a force "f" acting on the particle is represented by the product of the mass "m" and acceleration "a" of the particle. Besides, the measurement of the adhesion amount of particles to the solid surface is performed by tapping a slide glass. Accordingly, it is conceived that, at the time of the tapping, the force "f" acts on every particle at substantially the same acceleration "a" irrespective of how large the mass "m" of the particle is. Therefore, as the mass "m" of the particle (value of the cube of the particle diameter) increases, the force "f" acting on the particle at the time of the tapping (force causing the particle to be desorbed from the solid surface) increases.

TABLE 1

| | Main production conditions of third step | | Aging treatment conditions of mixed solution obtained through third step | | |
|---|---|---|---|---|---|
| | Organic solvent concentration of aqueous solution*1 Mass % | Organic solvent concentration of mixed solution*2 Mass % | Aging time of mixed solution*2 hr | Aging temperature of mixed solution*2 ° C. | Surface treatment*3 Performed/Not performed |
| Example A1 | 10 | 39 | 24 | 20 | Not performed |
| Example A2 | 20 | 44 | 24 | 20 | Not performed |
| Example A3 | 25 | 47 | 24 | 20 | Not performed |
| Example A4 | 30 | 49 | 24 | 20 | Not performed |
| Example A5 | 35 | 52 | 24 | 20 | Not performed |
| Example A6 | 40 | 54 | 24 | 20 | Not performed |
| Example A7 | 45 | 57 | 24 | 20 | Not performed |
| Example B1 | 10 | 39 | 24 | 20 | Performed |
| Example B2 | 20 | 44 | 15 | 20 | Performed |
| Example B3 | 25 | 47 | 24 | 20 | Performed |
| Example B4 | 30 | 49 | 24 | 20 | Performed |
| Example B5 | 30 | 49 | 24 | 20 | Performed |
| Example B6 | 30 | 49 | 168 | 20 | Performed |
| Example B7 | 30 | 49 | 168 | 20 | Performed |
| Example B8 | 35 | 52 | 24 | 20 | Performed |
| Example B9 | 40 | 54 | 24 | 20 | Performed |
| Example B10 | 40 | 54 | 168 | 20 | Performed |
| Example B11 | 45 | 57 | 24 | 20 | Performed |

TABLE 2

| | 50% cumulative circularity — | Particle density ρ g/cm$^3$ | $S_1$ m$^2$/g | $S_2$ m$^2$/g | $S_1/S_2$ | Adhesion amount of particles to solid surface g/m$^2$ | Particle diameter D50 µm | D10 µm | D90 µm | D90/D10 | M value Vol % |
|---|---|---|---|---|---|---|---|---|---|---|---|
| Example A1 | | 1.34 | 250.0 | 28.0 | 8.9 | 16.5 | 0.16 | 0.10 | 0.24 | 2.4 | 30 |
| Example A2 | 0.93 | 1.35 | 287.6 | 26.1 | 11.0 | 15.9 | 0.17 | 0.12 | 0.25 | 2.1 | 29 |
| Example A3 | | 1.35 | 287.0 | 13.9 | 20.6 | 15.1 | 0.32 | 0.16 | 0.43 | 2.7 | 31 |
| Example A4 | 0.93 | 1.34 | 285.9 | 13.2 | 21.7 | 14.8 | 0.34 | 0.09 | 0.45 | 5.0 | 32 |
| Example A5 | | 1.34 | 290.0 | 7.6 | 38.2 | 13.8 | 0.59 | 0.38 | 0.86 | 2.3 | 36 |
| Example A6 | 0.92 | 1.35 | 295.4 | 5.0 | 59.1 | 12.8 | 0.89 | 0.32 | 1.57 | 4.9 | 41 |
| Example A7 | | 1.34 | 272.0 | 4.4 | 61.8 | 11.2 | 1.02 | 0.58 | 1.51 | 2.6 | 41 |
| Example B1 | 0.93 | 1.31 | 249.4 | 28.6 | 8.7 | 17.1 | 0.16 | 0.10 | 0.23 | 2.3 | 58 |
| Example B2 | 0.93 | 1.32 | 254.1 | 28.4 | 8.9 | 16.4 | 0.16 | 0.11 | 0.25 | 2.3 | 60 |
| Example B3 | | 1.32 | 231.0 | 14.7 | 15.7 | 16.7 | 0.31 | 0.16 | 0.42 | 2.6 | 59 |

TABLE 2-continued

| | 50% cumulative circularity — | Particle density ρ g/cm$^3$ | $S_1$ m$^2$/g | $S_2$ m$^2$/g | $S_1/S_2$ | Adhesion amount of particles to solid surface g/m$^2$ | Particle diameter D50 μm | D10 μm | D90 μm | D90/D10 | M value Vol % |
|---|---|---|---|---|---|---|---|---|---|---|---|
| Example B4 | 0.93 | 1.30 | 162.5 | 13.2 | 12.3 | 16.0 | 0.35 | 0.10 | 0.46 | 4.6 | 59 |
| Example B5 | | 1.30 | 169.0 | 13.6 | 12.4 | 15.3 | 0.34 | 0.09 | 0.45 | 5.0 | 48 |
| Example B6 | 0.93 | 1.31 | 212.6 | 13.5 | 15.7 | 17.5 | 0.34 | 0.09 | 0.46 | 5.1 | 55 |
| Example B7 | | 1.31 | 215.0 | 12.7 | 16.9 | 15.5 | 0.36 | 0.10 | 0.49 | 4.9 | 47 |
| Example B8 | | 1.32 | 148.0 | 7.5 | 19.7 | 15.1 | 0.61 | 0.34 | 1.32 | 3.9 | 58 |
| Example B9 | 0.92 | 1.32 | 97.4 | 5.1 | 19.1 | 13.6 | 0.90 | 0.32 | 1.70 | 5.3 | 57 |
| Example B10 | 0.92 | 1.31 | 134.0 | 5.0 | 26.8 | 15.1 | 0.91 | 0.33 | 1.70 | 5.2 | 57 |
| Example B11 | | 1.32 | 163.2 | 4.5 | 36.3 | 13.7 | 1.02 | 0.59 | 1.52 | 2.6 | 57 |

TABLE 3

| | Peak area ratio*4 A % | B % | C % | Functional group ratio A/B | NMR Peak area ratio*5 D % | E % | Functional group ratio F (= D/(D + E)) *6 | G (= (A/B) × (1/F)) *7 | Carbon amount wt % |
|---|---|---|---|---|---|---|---|---|---|
| Example A1 | 1.63 | 98.37 | 0.00 | 0.017 | | | | | 18 |
| Example A2 | 1.54 | 98.46 | 0.00 | 0.016 | 21.0 | 100 | 0.174 | 0.092 | 18 |
| Example A3 | 1.72 | 98.28 | 0.00 | 0.018 | | | | | 18 |
| Example A4 | 1.66 | 98.34 | 0.00 | 0.017 | 22.0 | 100 | 0.180 | 0.094 | 18 |
| Example A5 | 1.99 | 98.01 | 0.00 | 0.020 | | | | | 18 |
| Example A6 | 2.20 | 97.80 | 0.00 | 0.022 | 21.0 | 100 | 0.174 | 0.126 | 17 |
| Example A7 | 2.33 | 97.67 | 0.00 | 0.024 | | | | | 18 |
| Example B1 | 2.07 | 89.93 | 8.00 | 0.023 | 26.3 | 100 | 0.208 | 0.111 | 19 |
| Example B2 | 2.23 | 90.74 | 7.03 | 0.025 | 27.2 | 100 | 0.214 | 0.117 | 19 |
| Example B3 | 1.88 | 91.13 | 6.99 | 0.021 | | | | | 19 |
| Example B4 | 1.79 | 91.52 | 6.70 | 0.020 | 28.8 | 100 | 0.224 | 0.089 | 18 |
| Example B5 | 2.08 | 91.30 | 6.62 | 0.023 | | | | | 17 |
| Example B6 | 2.54 | 93.14 | 4.33 | 0.027 | 25.7 | 100 | 0.204 | 0.132 | 18 |
| Example B7 | 2.44 | 93.28 | 4.28 | 0.026 | | | | | 17 |
| Example B8 | 2.22 | 91.90 | 5.88 | 0.024 | | | | | 18 |
| Example B9 | 1.85 | 91.51 | 6.64 | 0.020 | 28.7 | 100 | 0.223 | 0.090 | 17 |
| Example B10 | 2.10 | 95.27 | 2.64 | 0.022 | 26.9 | 100 | 0.212 | 0.104 | 17 |
| Example B11 | 2.31 | 94.47 | 3.22 | 0.024 | | | | | 17 |

TABLE 4

| | Main production conditions of third step: Organic solvent concentration of aqueous solution*1 Mass % | Organic solvent concentration of mixed solution*2 Mass % | Aging treatment conditions of mixed solution obtained through third step: Aging time of mixed solution*2 hr | Aging temperature of mixed solution*2 ° C. | Surface treatment*3 Performed/ Not performed |
|---|---|---|---|---|---|
| Example A8 | 20 | 44 | 24 | 20 | Not performed |
| Example A9 | 30 | 49 | 144 | 20 | Not performed |
| Example A10 | 20 | 44 | 24 | 20 | Not performed |
| Example A11 | 25 | 47 | 144 | 20 | Not performed |
| Example A12 | 15 | 42 | 24 | 20 | Not performed |
| Example A13 | 25 | 47 | 144 | 20 | Not performed |

TABLE 4-continued

| | Main production conditions of third step: Organic solvent concentration of aqueous solution*1 Mass % | Organic solvent concentration of mixed solution*2 Mass % | Aging treatment conditions of mixed solution obtained through third step: Aging time of mixed solution*2 hr | Aging temperature of mixed solution*2 ° C. | Surface treatment*3 Performed/ Not performed |
|---|---|---|---|---|---|
| Example A14 | 15 | 42 | 24 | 20 | Not performed |
| Example B12 | 30 | 49 | 144 | 20 | Performed |
| Example B13 | 20 | 44 | 24 | 20 | Performed |
| Example B14 | 25 | 47 | 144 | 20 | Performed |
| Example B15 | 25 | 47 | 144 | 20 | Performed |
| Example A15 | 20 | 44 | 72 | 20 | Not performed |
| Example B16 | 20 | 44 | 72 | 20 | Performed |

TABLE 5

| | 50% cumulative circularity — | Particle density g/cm$^3$ | $S_1$ m$^2$/g | $S_2$ m$^2$/g | $S_1/S_2$ | Adhesion amount of particles to solid surface g/m$^2$ | Particle diameter D50 µm | D10 µm | D90 µm | D90/D10 | M value Vol % |
|---|---|---|---|---|---|---|---|---|---|---|---|
| Example A8 | | 1.35 | 268.4 | 22.2 | 12.1 | 13.8 | 0.20 | 0.13 | 0.27 | 2.1 | 30 |
| Example A9 | 0.93 | 1.35 | 269.0 | 9.3 | 28.9 | 12.0 | 0.48 | 0.36 | 0.64 | 1.8 | 35 |
| Example A10 | | 1.35 | 297.3 | 12.0 | 24.8 | 12.2 | 0.37 | 0.08 | 0.48 | 6.0 | 33 |
| Example A11 | 0.93 | 1.35 | 259.7 | 6.0 | 43.3 | 10.1 | 0.74 | 0.42 | 1.06 | 2.5 | 40 |
| Example A12 | | 1.35 | 283.1 | 15.3 | 18.5 | 13.3 | 0.29 | 0.20 | 0.39 | 2.0 | 33 |
| Example A13 | 0.92 | 1.35 | 291.0 | 12.7 | 22.9 | 14.1 | 0.35 | 0.26 | 0.45 | 1.7 | 32 |
| Example A14 | | 1.35 | 281.8 | 31.7 | 8.9 | 14.8 | 0.14 | 0.10 | 0.19 | 1.9 | 31 |
| Example B12 | 0.93 | 1.31 | 291.2 | 11.7 | 24.9 | 12.7 | 0.39 | 0.29 | 0.52 | 1.8 | 55 |
| Example B13 | | 1.32 | 263.0 | 12.3 | 21.4 | 12.9 | 0.37 | 0.08 | 0.47 | 5.9 | 56 |
| Example B14 | 0.93 | 1.32 | 293.5 | 8.9 | 33.0 | 12.8 | 0.51 | 0.30 | 1.08 | 3.6 | 55 |
| Example B15 | | 1.30 | 299.2 | 15.4 | 19.4 | 14.3 | 0.30 | 0.22 | 0.38 | 1.7 | 57 |
| Example A15 | 0.93 | 1.34 | 287.2 | 13.6 | 21.1 | 14.1 | 0.33 | 0.23 | 0.49 | 2.1 | 31 |
| Example B16 | 0.92 | 1.30 | 243.3 | 14.4 | 16.9 | 14.6 | 0.32 | 0.23 | 0.48 | 2.1 | 59 |

TABLE 6

| | Peak area ratio*4 A % | B % | C % | Functional group ratio A/B | NMR Peak area ratio*5 D % | E % | Functional group ratio F (= D/(D + E)) *6 | G (= (A/B) × (1/F)) *7 | Carbon amount wt % |
|---|---|---|---|---|---|---|---|---|---|
| Example A8 | | | | | | | | | 17 |
| Example A9 | 1.47 | 98.53 | 0.00 | 0.015 | 24.6 | 100 | 0.197 | 0.076 | 18 |
| Example A10 | | | | | | | | | 18 |
| Example A11 | 1.22 | 98.78 | 0.00 | 0.012 | 24.5 | 100 | 0.197 | 0.061 | 18 |
| Example A12 | | | | | | | | | 18 |
| Example A13 | 1.52 | 98.48 | 0.00 | 0.015 | 24.7 | 100 | 0.198 | 0.076 | 18 |
| Example A14 | | | | | | | | | 17 |
| Example B12 | 1.42 | 93.78 | 4.80 | 0.015 | 24.5 | 100 | 0.197 | 0.076 | 18 |
| Example B13 | | | | | | | | | 18 |
| Example B14 | 1.51 | 93.99 | 4.50 | 0.016 | 26.0 | 100 | 0.206 | 0.078 | 18 |
| Example B15 | 1.51 | 93.50 | 5.00 | 0.016 | 23.3 | 100 | 0.189 | 0.085 | 18 |
| Example A15 | | | | | | | | | 18 |
| Example B16 | | | | | | | | | 18 |

TABLE 7

| | Main production conditions of third step: Organic solvent concentration of aqueous solution*1 Mass % | Organic solvent concentration of mixed solution*2 Mass % | Aging treatment conditions of mixed solution obtained through third step: Aging time of mixed solution*2 hr | Aging temperature of mixed solution*2 ° C. | Surface treatment*3 Performed/ Not performed |
|---|---|---|---|---|---|
| Comparative Example A1 | 50 | 59 | 24 | 20 | Not performed |
| Comparative Example A2 | 0 | 49 | 24 | 20 | Not performed |
| Comparative Example A3 | 0 | 48 | 24 | 20 | Not performed |
| Comparative Example A4 | 0 | 34 | 24 | 20 | Not performed |
| Comparative Example B1 | 0 | 49 | 0.5 | 20 | Performed |
| Comparative Example B2 | 0 | 49 | 12 | 20 | Performed |

TABLE 7-continued

| | Main production conditions of third step: Organic solvent concentration of aqueous solution*1 Mass % | Organic solvent concentration of mixed solution*2 Mass % | Aging treatment conditions of mixed solution obtained through third step: Aging time of mixed solution*2 hr | Aging temperature of mixed solution*2 ° C. | Surface treatment*3 Performed/ Not performed |
|---|---|---|---|---|---|
| Comparative Example B3 | 0 | 48 | 0.5 | 20 | Performed |
| Comparative Example B4 | 0 | 48 | 12 | 20 | Performed |
| Comparative Example B5 | 0 | 34 | 24 | 20 | Performed |
| Comparative Example A5 | 10 | 30 | 24 | 20 | Not performed |
| Comparative Example A6 | 10 | 39 | 0.5 | 20 | Not performed |
| Comparative Example A7 | 20 | 44 | 0.5 | 20 | Not performed |
| Comparative Example A8 | — | — | — | — | Not performed |

TABLE 7-continued

| | Main production conditions of third step: Organic solvent concentration of aqueous solution*[1] Mass % | Main production conditions of third step: Organic solvent concentration of mixed solution*[2] Mass % | Aging treatment conditions of mixed solution obtained through third step: Aging time of mixed solution*[2] hr | Aging treatment conditions of mixed solution obtained through third step: Aging temperature of mixed solution*[2] ° C. | Surface treatment*[3] Performed/Not performed |
|---|---|---|---|---|---|
| Comparative Example A9 | — | — | — | — | Not performed |
| Comparative Example B6 | — | — | — | — | Performed |

TABLE 8

| | 50% cumulative circularity — | Particle density g/cm$^3$ | $S_1$ m$^2$/g | $S_2$ m$^2$/g | $S_1/S_2$ | Adhesion amount of particles to solid surface g/m$^2$ | Particle diameter D50 μm | Particle diameter D10 μm | Particle diameter D90 μm | D90/D10 | M value Vol % |
|---|---|---|---|---|---|---|---|---|---|---|---|
| Comparative Example A1 | Particles not formed | | | | | | | | | | |
| Comparative Example A2 | 0.93 | 1.35 | 96.0 | 13.5 | 7.1 | 11.4 | 0.33 | 0.25 | 0.42 | 1.7 | 33 |
| Comparative Example A3 | 0.93 | 1.35 | 119.3 | 21.2 | 5.6 | 12 | 0.21 | 0.14 | 0.30 | 2.1 | 33 |
| Comparative Example A4 | 0.94 | 1.35 | 257.9 | 40.5 | 6.4 | 17.6 | 0.11 | 0.06 | 0.19 | 3.2 | 32 |
| Comparative Example B1 | | 1.32 | 122.2 | 18.2 | 6.7 | 11.9 | 0.25 | 0.16 | 0.41 | 2.6 | |
| Comparative Example B2 | | 1.32 | 101.6 | 15.7 | 6.5 | 11.7 | 0.29 | 0.18 | 0.42 | 2.3 | |
| Comparative Example B3 | | 1.32 | 157.2 | 25.3 | 6.2 | 12.5 | 0.18 | 0.12 | 0.30 | 2.5 | |
| Comparative Example B4 | | 1.32 | 151.1 | 23.9 | 6.3 | 12.3 | 0.19 | 0.13 | 0.30 | 2.3 | |
| Comparative Example B5 | 0.95 | 1.30 | 255.0 | 38.5 | 6.6 | 18.7 | 0.12 | 0.07 | 0.20 | 2.9 | 65 |
| Comparative Example A5 | 0.94 | 1.35 | 165.8 | 24.7 | 6.7 | 12.2 | 0.18 | 0.13 | 0.25 | 1.9 | 31 |
| Comparative Example A6 | 0.93 | 1.35 | 219.0 | 34.2 | 6.4 | 13.1 | 0.13 | 0.10 | 0.18 | 1.8 | 30 |
| Comparative Example A7 | Particle formation failure | | | | | | | | | | |
| Comparative Example A8 | 0.92 | 1.35 | 16.5 | 7.4 | 2.2 | 8.2 | 0.60 | 0.28 | 1.75 | 6.3 | 26 |
| Comparative Example A9 | 0.92 | 1.36 | 6.2 | 8.7 | 0.7 | 7.0 | 0.50 | 0.21 | 1.05 | 5.0 | 21 |
| Comparative Example B6 | 0.92 | 1.35 | 18.2 | 7.6 | 2.4 | 9.1 | 0.59 | 0.28 | 1.78 | 6.4 | 65 |

TABLE 9

| | Peak area ratio*4 | | | Functional group | NMR Peak area ratio*5 | | Functional group ratio | | Carbon |
|---|---|---|---|---|---|---|---|---|---|
| | A % | B % | C % | ratio A/B | D % | E % | F (= D/(D + E)) *6 | G (= (A/B) × (1/F)) *7 | amount wt % |
| Comparative Example A1 | Particles not formed | | | | | | | | |
| Comparative Example A2 | 1.43 | 98.57 | 0.00 | 0.015 | 24.6 | 100 | 0.197 | 0.076 | 18 |
| Comparative Example A3 | 1.39 | 98.61 | 0.00 | 0.014 | 24.2 | 100 | 0.195 | 0.075 | 18 |
| Comparative Example A4 | 1.44 | 98.56 | 0.00 | 0.015 | 25.0 | 100 | 0.200 | 0.075 | 18 |
| Comparative Example B1 | | | | | | | | | |
| Comparative Example B2 | | | | | | | | | |
| Comparative Example B3 | | | | | | | | | |
| Comparative Example B4 | | | | | | | | | |
| Comparative Example B5 | 1.36 | 84.30 | 14.34 | 0.016 | 21.4 | 100 | 0.176 | 0.091 | 20 |
| Comparative Example A5 | 1.34 | 98.66 | 0.00 | 0.014 | | | | | 18 |
| Comparative Example A6 | 1.43 | 98.57 | 0.00 | 0.015 | | | | | 17 |
| Comparative Example A7 | Particle formation failure | | | | | | | | |
| Comparative Example A8 | 0.00 | 100.00 | 0.00 | 0.000 | 38.9 | 100 | 0.280 | 0.000 | 15 |
| Comparative Example A9 | 0.00 | 100.00 | 0.00 | 0.000 | 50.9 | 100 | 0.337 | 0.000 | 12 |
| Comparative Example B6 | 0.00 | 92.26 | 7.74 | 0.000 | 28.0 | 100 | 0.219 | 0.000 | 16 |

The invention claimed is:

1. A spherical polymethylsilsesquioxane particle, comprising a particle main body containing at least:

a network structure formed by silicon atoms (n) and oxygen atoms (n) bonded to the silicon atoms (n);

a methyl group bonded to at least one of the silicon atoms (n); and an alkoxyl group bonded to at least one of the silicon atoms (n), wherein the particle density ρ is from 1.30 $g/m^3$ to 1.35 $g/m^3$, wherein the spherical polymethylsilsesquioxane particle satisfies the following expression (1):

$$100 \geq S_1/S_2 \geq 8.0 \quad \text{Expression (1)}$$

in the expression (1), $S_1$ represents a specific surface area ($m^2/g$) measured by a nitrogen adsorption BET one-point method, $S_2$ represents 6/(ρ×D50) and a unit thereof is ($m^2/g$), ρ represents a true density ($g/m^3$) of the spherical polymethylsilsesquioxane particle, and D50 represents a volume-based 50% cumulative diameter (m) measured by a laser diffraction/scattering method.

2. The spherical polymethylsilsesquioxane particle according to claim 1, wherein the ratio $S_1/S_2$ shown in the expression (1) is less than or equal to 100 and equal to or greater than 10.0.

3. The spherical polymethylsilsesquioxane particle according to claim 1, wherein the ratio $S_1/S_2$ shown in the expression (1) is equal to or less than 61.8 and equal to or greater than 10.

4. The spherical polymethylsilsesquioxane particle according to claim 1, wherein the particle main body has a surface free from being subjected to any surface treatment.

5. The spherical polymethylsilsesquioxane particle according to claim 1, wherein the spherical polymethylsilsesquioxane particle has a degree of hydrophobicity measured by a methanol titration method of from 25 vol % to 45 vol %.

6. The spherical polymethylsilsesquioxane particle according to claim 1, wherein the particle main body has a surface subjected to surface treatment with a hydrophobizing agent.

7. The spherical polymethylsilsesquioxane particle according to claim 1, wherein the particle main body contains, at least in a vicinity of a surface thereof, a trialkylsilyloxy group bonded to at least one of the silicon atoms (n).

8. The spherical polymethylsilsesquioxane particle according to claim 7, wherein the trialkylsilyloxy group is a trimethylsilyloxy group.

9. The spherical polymethylsilsesquioxane particle according to claim 1, wherein the spherical polymethylsilsesquioxane particle has a degree of hydrophobicity measured by a methanol titration method of more than 45 vol % and 70 vol % or less.

10. The spherical polymethylsilsesquioxane particle according to claim 1, wherein the spherical polymethylsilsesquioxane particle satisfies the following expression (2):

$$0.016 \leq A/B \leq 0.030 \quad \text{Expression (2)}$$

in the expression (2), A and B each represent an area of a peak measured by $^{13}C$ DDMAS NMR, A represents an area of a peak derived from a carbon atom contained in the alkoxyl group, the carbon atom being bonded to an oxygen atom (tg) contained in the alkoxyl group, and B represents an area of a peak derived from a carbon atom contained in the methyl group bonded to at least one of the silicon atoms (n).

11. The spherical polymethylsilsesquioxane particle according to claim 10, wherein the ratio A/B shown in the expression (2) is from 0.020 to 0.030.

12. The spherical polymethylsilsesquioxane particle according to claim 1, wherein the 50% cumulative diameter is from 0.14 μm to 2.0 μm.

13. The spherical polymethylsilsesquioxane particle according to claim 12, wherein the 50% cumulative diameter is more than 0.30 μm and 2.0 μm or less.

14. The spherical polymethylsilsesquioxane particle according to claim 1, wherein the 50% cumulative diameter is more than 0.30 μm.

15. The spherical polymethylsilsesquioxane particle according to claim 1, wherein the alkoxyl group is a methoxy group.

* * * * *